(12) United States Patent
Yamaga et al.

(10) Patent No.: US 12,332,780 B2
(45) Date of Patent: Jun. 17, 2025

(54) STORAGE SYSTEM

(71) Applicant: Hitachi, Ltd., Tokyo (JP)

(72) Inventors: Yusuke Yamaga, Tokyo (JP); Takaki Matsushita, Tokyo (JP); Akira Deguchi, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 36 days.

(21) Appl. No.: 18/461,731

(22) Filed: Sep. 6, 2023

(65) Prior Publication Data
US 2024/0403210 A1 Dec. 5, 2024

(30) Foreign Application Priority Data
May 31, 2023 (JP) ................................. 2023-089833

(51) Int. Cl.
G06F 12/02 (2006.01)
(52) U.S. Cl.
CPC .... *G06F 12/0253* (2013.01); *G06F 2212/702* (2013.01)
(58) Field of Classification Search
CPC .................. G06F 12/0253; G06F 2212/702
See application file for complete search history.

(56) References Cited

U.S. PATENT DOCUMENTS

| | | | |
|---|---|---|---|
| 10,963,485 B1* | 3/2021 | Matsushita | G06F 16/128 |
| 11,436,140 B2* | 9/2022 | Na | G06F 12/0238 |
| 2010/0082900 A1* | 4/2010 | Murayama | G06F 3/0608 |
| | | | 711/E12.001 |
| 2019/0188090 A1* | 6/2019 | Mukku | G06F 12/0253 |
| 2019/0286556 A1* | 9/2019 | You | G06F 12/0246 |

FOREIGN PATENT DOCUMENTS

JP 2022-026812 A 2/2022

* cited by examiner

*Primary Examiner* — Zhuo H Li
(74) *Attorney, Agent, or Firm* — Volpe Koenig

(57) ABSTRACT

A processor inputs/outputs data related to data input/output with respect to the volume to/from a page of the logical storage area; maps the volume to data of the logical storage area; is able to release the storage area in units of the pages; includes a plurality of the volumes that can share data of the logical storage area; performs garbage collection of deleting data which is not referred to from any of the plurality of volumes as invalid data, moving data which is referred to from any of the volumes to another page, and releasing a storage area of a page on which the data is deleted and the data is moved; and stores a plurality of pieces of data in the page of a movement destination such that the plurality of pieces of data stored in the same page is mapped from a same volume by the garbage collection.

6 Claims, 29 Drawing Sheets

| IN-PVOL/SS ADDRESS | REFERENCE DESTINATION ADDRESS (IN-MAPPING AREA ADDRESS) |
|---|---|
| 0 | 100 |
| 10 | 300 |
| 20 | 500 |
| ... | ... |

| IN-MAPPING AREA ADDRESS 600 | REFERENCE DESTINATION ADDRESS (IN-WRITE-ONCE ADDRESS) 601 |
|---|---|
| 100 | 100 |
| 200 | 300 |
| ... | ... |
|  | 1000 |
|  | ... |
|  | ... |

| IN-MAPPING AREA ADDRESS | REFERENCE DESTINATION ADDRESS (IN-WRITE-ONCE AREA ADDRESS) | POST-COMPRESSION CAPACITY | Snapshot# |
|---|---|---|---|
| 100 | 100 | 5 | 7 |
|  | 300 | 2 | – |
|  | ⋮ | ⋮ | ⋮ |
| 200 | 1000 | 10 | 500 |
|  | ⋮ | ⋮ | ⋮ |
| ⋮ | ⋮ | ⋮ | ⋮ |

| VOL#/Snapshot# | ATTRIBUTE | PVOL# | DIRECTORY# | VOL CAPACITY | Pool# |
|---|---|---|---|---|---|
| 0 | PVOL | 0 | 0 | 200GB | 0 |
| 1 | SS | 0 | 5 | 200GB | 0 |
| 2 | SS | 0 | 10 | 200GB | 0 |
| 3 | SS MANAGEMENT | – | – | 1TB | 0 |
| 4 | WRITE-ONCE | – | – | 1TB | 0 |
| ... | ... | ... | ... | ... | ... |

| DIRECTORY# | ALLOCATION DESTINATION VOL/Snapshot# |
|---|---|
| 0 | 10 |
| 1 | 20 |
| 2 | – (UNALLOCATED) |
| 3 | 30 |
| ... | ... |

| DIRECTORY# | Previous DIRECTORY# | Next DIRECTORY# |
|---|---|---|
| 0 | — | 3 |
| 1 | 2 | 50 |
| 2 | 3 | 1 |
| 3 | 0 | 2 |
| ... | ... | ... |

| PVOL# | LATEST GENERATION# | GENERATION# | Snapshot CREATION TIME | Snapshot# | STATE | DEFRAGMENTATION FLAG |
|---|---|---|---|---|---|---|
| 0 | 5 | 4 | T4 | 100 | SUSPEND | UNCOMPLETED |
|  |  | 5 | T5 | 200 | SUSPEND | UNCOMPLETED |
|  |  | ... | ... | ... | ... | ... |
|  |  | 3 | T3 | 500 | SUSPEND | COMPLETED |
| 1 | 0 | 0 | T2 | 30 | PAIR | UNCOMPLETED |
|  |  | ... | ... | ... | ... | ... |
| ... |  | ... | ... | ... | ... | ... |

| IN-VOL ADDRESS | ALLOCATION FLAG | PAGE# | GC UNNECESSARY FLAG |
|---|---|---|---|
| 0 | ALLOCATED | 0 | NECESSARY |
| 100 | ALLOCATED | 1 | UNNECESSARY |
| 200 | UNALLOCATED | – | NECESSARY |
| ... | ... | ... | |

| PAGE# | ALLOCATION FLAG | ALLOCATION DESTINATION VOL# | ALLOCATION DESTINATION IN-VOL ADDRESS |
|---|---|---|---|
| 0 | ALLOCATED | 0 | 100 |
| 1 | ALLOCATED | 1 | 200 |
| 2 | UNALLOCATED | – | – |
| ... | ... | ... | ... |

| PAGE# | IN-PAGE ADDRESS | SUB-BLOCK SIZE | REFERENCE SOURCE ADDRESS | ALLOCATION FLAG |
|---|---|---|---|---|
| 0 | 20 | 4 | 1000 | ALLOCATED |
| ... | ... | ... | ... | ... |

| DATA# | REFERENCE DESTINATION ADDRESS (IN-WRITE-ONCE AREA ADDRESS) |
|---|---|
| 0 | 0 |
| 1 | 20 |
| 2 | 100 |
| ... | ... |

1500, 1501

STORAGE SYSTEM

BACKGROUND OF THE INVENTION

1. Field of the Invention

The present invention relates to a storage system.

2. Description of the Related Art

In recent years, there is an increasing need for data utilization and an increasing number of opportunities for data replication. As a result, a snapshot function becomes more important in a storage system. Conventionally, a representative means for realizing snapshot is a Redirect on Write (ROW) method (see, for example, JP 2022-26812 A). Since there is no data copy at the time of I/O, the ROW method has an advantage that the influence on the I/O performance is small. The ROW method is often adopted in all flash array (AFA) devices.

The ROW method is a method of additionally writing data. The write-once is a data storage scheme in which, when data is written to the storage system, the write data is stored in the new area without overwriting the old data stored before the writing, and the meta information is rewritten so as to refer to the data stored in the new area. At this time, the old data before the update is invalid data called garbage. When the garbage increases due to the write processing, the capacity of the storage system is squeezed. Therefore, it is necessary to secure the capacity of the storage system by executing garbage collection (GC) for collecting the garbage to free up the capacity.

SUMMARY OF THE INVENTION

In the GC processing, valid data other than garbage is copied to another area for each capacity management unit of the storage system, and a free space is secured by releasing the target area. When a snapshot is acquired from the replication source volume and written, differential data that is a difference between the replication source volume and the snapshot increases, and valid data in the storage system also increases. In the related art, there is a problem that as the valid data amount increases, the effective data copy amount at the time of performing the GC also increases, and the GC processing amount increases and the I/O performance is affected.

Further, when a snapshot is deleted, the differential data becomes garbage. The GC processing is also required to collect the garbage generated by the snapshot deletion and free the capacity of the storage system, and there is a problem that the I/O performance is affected by the operation of the GC processing.

The present invention has been made in view of the above problems, and an object thereof is to suppress a GC processing amount at the time of using a snapshot in a storage system and to maintain I/O performance.

In order to solve the above problems, one of the representative storage systems of the present invention is a storage system including: a storage device; and a processor configured to process data input to and output from the storage device. The processor is configured to: form a page capable of storing a plurality of pieces of data in a logical storage area configured based on a physical storage area of the storage device; provide a volume and input/output data related to data input/output with respect to the volume to/from a page of the logical storage area; map the volume to data of the logical storage area; be able to release the storage area in units of the pages; include a plurality of the volumes that can share data of the logical storage area; perform garbage collection of deleting data which is not referred to from any of the plurality of volumes as invalid data, moving data which is referred to from any of the volumes to another page, and releasing a storage area of a page on which the data is deleted and the data is moved; and store a plurality of pieces of data in the page of a movement destination such that the plurality of pieces of data stored in the same page is mapped from a same volume by the garbage collection.

One of the representative storage systems of the present invention is a storage device including: a storage device; and a processor configured to process data input to and output from the storage device. The processor is further configured to: form a page capable of storing a plurality of pieces of data in a logical storage area configured based on a physical storage area of the storage device; provide a volume and input/output data related to data input/output with respect to the volume to/from a page of the logical storage area; map the volume to data of the logical storage area; include a plurality of the volumes that can share data of the logical storage area; perform garbage collection processing of deleting data which is not referred to from any of the plurality of volumes as invalid data, moving data which is referred to from any of the plurality of volumes to another page, and releasing a storage area of a page on which the data is deleted and the data is moved; set a page mapped from the same volume for all stored data to be excluded from the garbage collection processing; and when the one volume to which data of a page set to be excluded from the garbage collection processing is mapped is deleted, delete the data and release a storage area of a page.

According to the present invention, it is possible to efficiently manage a memory in a storage system and maintain data processing performance. Objects, configurations, and effects besides the above description will be apparent through the explanation on the following embodiments.

BRIEF DESCRIPTION OF THE DRAWINGS

FIG. 5 is a diagram illustrating an example of a directory table;

FIG. 6 is a diagram illustrating an example of a mapping table for a snapshot management volume;

FIG. 7 is a diagram illustrating an example of a mapping table for a write-once volume;

FIG. 8 is a diagram illustrating an example of a volume management table;

FIG. 9 is a diagram illustrating an example of a directory area allocation management table;

FIG. 10 is a diagram illustrating an example of a directory tree management table;

FIG. 11 is a diagram illustrating an example of a snapshot generation management table;

FIG. 12 is a diagram illustrating an example of a page conversion table;

FIG. 13 is a diagram illustrating an example of a page allocation management table;

FIG. 14 is a diagram illustrating an example of a sub-block management table;

FIG. 15 is a diagram illustrating an example of a search data management table;

DESCRIPTION OF THE PREFERRED EMBODIMENTS

Figure 1:
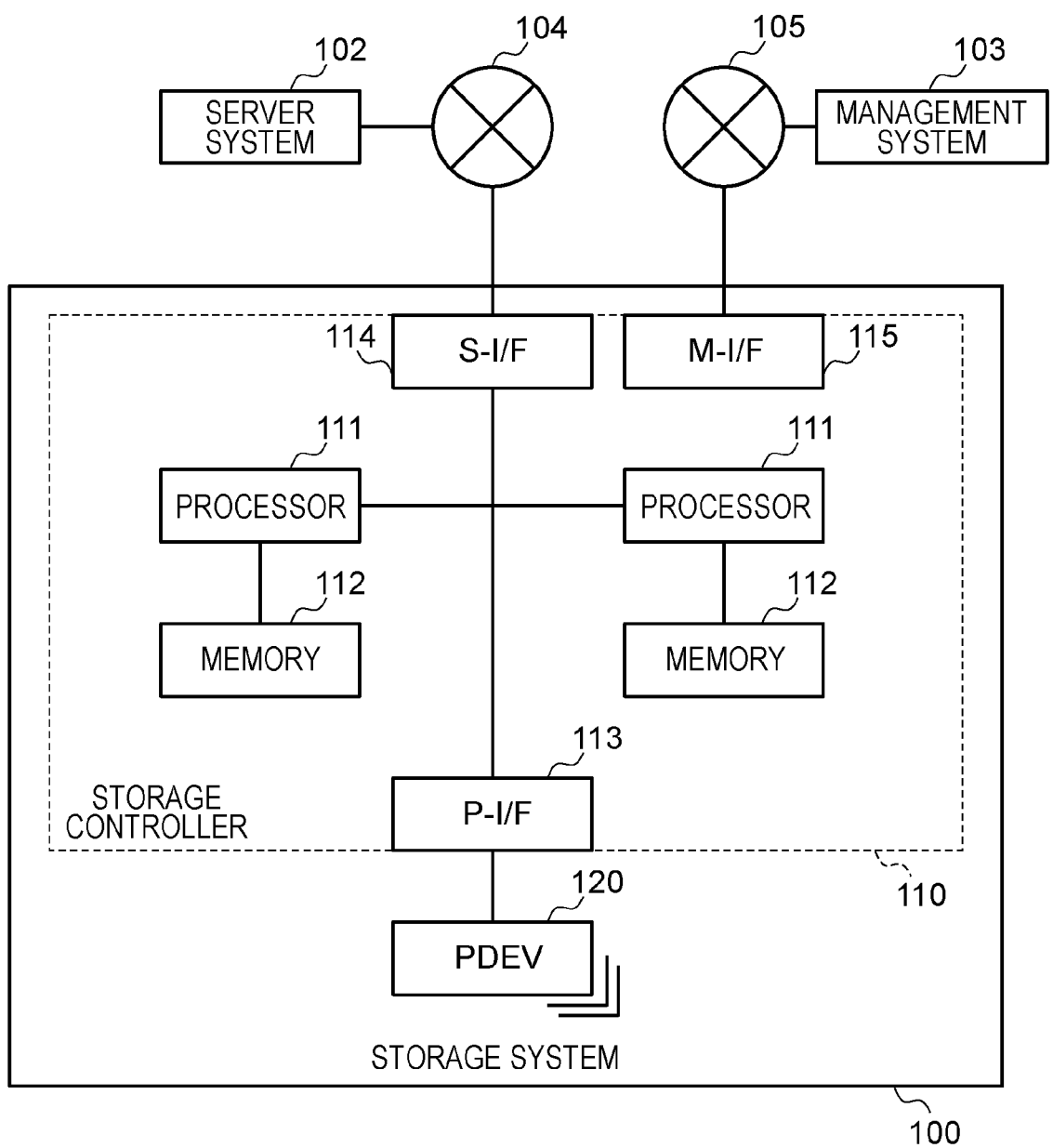
FIG. 1 is a diagram illustrating a configuration example of a system including a storage system according to an embodiment.

In the following description, "interface unit" may be configured by one or more interfaces. The one or more interfaces may be one or more communication interface devices of the same type (for example, one or more NICs (Network Interface Card)), or may be two or more communication interface devices of different types (for example, NIC and HBA (Host Bus Adapter)).

In addition, in the following description, a "memory unit" may be configured by one or more memories, or may typically be a main storage device. At least one memory in the memory unit may be a volatile memory, or may be a non-volatile memory.

In addition, in the following description, a "PDEV unit" may be one or more PDEVs, or may typically be an auxiliary storage device. The "PDEV" means a physical storage device, and typically is a non-volatile storage device such as an HDD (Hard Disk Drive) or an SSD (Solid State Drive).

In addition, in the following description, a "storage unit" is at least one (typically at least the memory unit) of the memory unit and at least a part of the PDEV unit.

In addition, in the following description, a "processor unit" is configured by one or more processors. At least one processor is typically a microprocessor such as a CPU (Central Processing Unit), or may be other types of processors such as a GPU (Graphics Processing Unit). At least one processor may be configured by a single core, or multiple cores.

In addition, at least one processor may be a processor such as a hardware circuit (for example, FPGA (Field-Programmable Gate Array) or an ASIC (Application Specific Integrated Circuit)) which performs some or all of the processes in a broad sense.

In addition, in the following description, information for obtaining an output with respect to an input will be described using an expression of "xxx table". The information may be data of any structure, or may be a learning model such as a neural network in which an output with respect to an input is generated. Therefore, the "xxx table" can be called "xxx information".

In addition, in the following description, the configuration of each table is given as merely exemplary. One table may be divided into two or more tables, or all or some of two or more tables may be configured by one table.

In addition, in the following description, a process may be described to be performed by a "program". The program is performed by the processor unit, and a designated process is performed appropriately using a storage unit and/or an interface unit. Therefore, the subject of the process may be the processor unit (or a device such as a controller which includes the processor unit).

The program may be installed in a device such as a calculator, or may be, for example, a program distribution server or a (for example, non-temporary) recording medium which can be read by a calculator. In addition, in the following description, two or more programs may be expressed as one program, or one program may be expressed as two or more programs.

In addition, in the following description, a "computer system" is a system which includes one or more physical calculators. The physical calculator may be a general purpose calculator or a dedicated calculator. The physical calculator may serve as a calculator (for example, a host calculator) which issues an I/O (Input/Output) request, or may serve as a calculator (for example, a storage device) which inputs or outputs data in response to an I/O request.

In other words, the computer system may be at least one of one or more host systems which are host calculators issuing the I/O request, and a storage system which is one or more storage devices for inputting or outputting data in response to the I/O request. In at least one physical calculator, one or more virtual calculators (for example, VM (Virtual Machine)) may be performed. The virtual calculator may be calculator which issues an I/O request, or may be a calculator which inputs or outputs data in response to an I/O request.

In addition, the computer system may be a distribution system which is configured by one or more (typically, plural) physical node devices. The physical node device is a physical calculator.

In addition, SDx (Software-Defined anything) may be established in the physical calculator (for example, a node device) or the computer system which includes the physical calculator by performing predetermined software in the physical calculator. Examples of the SDx may include an SDS (Software Defined Storage) or an SDDC (Software-defined Datacenter).

For example, the storage system as an SDS may be established by a general-purpose physical calculator which performs software having a storage function.

In addition, at least one physical calculator (for example, a storage device) may be configured by one or more virtual calculators as a host system and a virtual calculator as the storage controller (typically, a device which inputs or outputs data with respect to the PDEV unit in response to the I/O request) of the storage system.

In other words, at least one such physical calculator may have both a function as at least a part of the host system and a function as at least a part of the storage system.

In addition, the computer system (typically, the storage system) may include a redundant configuration group. The redundant configuration may be configured by Erasure Coding, RAIN (Redundant Array of Independent Nodes) and a plurality of node devices such as mirroring between nodes, or may be configured by a single calculator (for example, the node device) such as one or more RAID (Redundant Array of Independent (or Inexpensive) Disks) groups as at least a part of the PDEV unit.

In addition, a "data set" in the following description is a lump of logical electronic data viewed from a program such as an application program, and may include any one of a record, a file, a key value pair, and a tuple for example.

In addition, in the following description, identification numbers are used as identification information of various types of targets. Identification information (for example, an identifier containing alphanumeric characters and symbols) other than the identification number may be employed.

In addition, in the following description, in a case where similar types of elements are described without distinction, the reference symbols (or common symbol among the reference symbols) may be used. In a case where the similar elements are described distinctively, the identification numbers (or the reference symbols) of the elements may be used.

For example, in a case where "page" (a unit of storage area) is described without any particular distinction, it will be denoted as "page 312". In a case where each page is described distinctively, it will be denoted with "page #0" and "page #1" using the page number, or will be denoted with "independent page 312-0" and "page 312-1" using the reference symbol.

First Embodiment

Hereinafter, a first embodiment of the present invention will be described using FIGS. 1 to 26.

FIG. 1 is a diagram illustrating a configuration example of a system including a storage system 100. The storage system 100 includes a plurality (or one) of PDEVs 120 and a storage controller 110 which is connected to the PDEV 120.

The storage controller 110 includes an S-I/F 114, an M-I/F 115, a P-I/F 113, a memory 112, and a processor 111. Herein, the S-I/F 114, the M-I/F 115, and the P-I/F 113 are examples of the interface unit. The memory 112 is an example of the storage unit.

The S-I/F 114 is a communication interface device which relays exchanging data between a server system 102 and the storage controller 110. The server system 102 is connected to the S-I/F 114 via a Fibre Channel (FC) network 104.

The server system 102 transmits an I/O request (write request or read request), which is designated with an I/O destination (for example, a logical volume number such as a LUN (Logical Unit Number) and a logical address such as an LBA (Logical Block Address)), to the storage controller 110.

The M-I/F 115 is a communication interface device which relays exchanging data between a management system 103 and the storage controller 110. The management system 103 is connected to the M-I/F 115 via an Internet Protocol (IP) network 105.

The network 104 and the network 105 may be the same communication network. The management system 103 manages the storage system 100.

The P-I/F 113 is a communication interface device which relays exchanging data between the plurality of PDEVs 120 and the storage controller 110. The plurality (or one) of PDEVs 120 are connected to the P-I/F 113.

The memory 112 stores programs executed by the processor 111, data used by the processor 111. The processor 111 executes the program stored in the memory 112. In this embodiment, for example, the set of the memory 112 and the processor 111 is duplicated.

Figure 2:
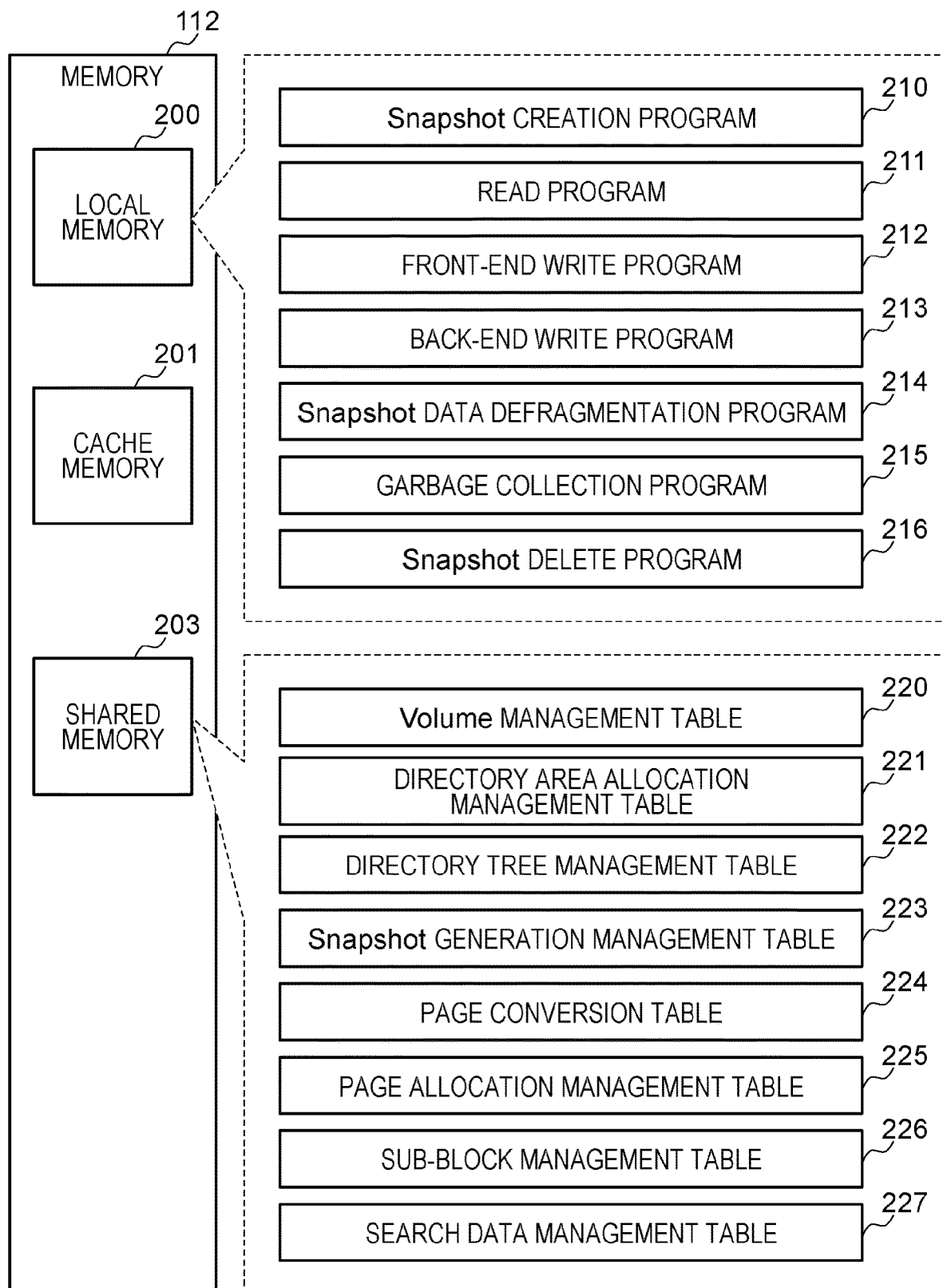
FIG. 2 is a diagram illustrating an example of a memory configuration, and programs and management information in a memory according to a first embodiment.

FIG. 2 is a diagram illustrating an example of the configuration of the memory 112, and programs and management information in the memory 112. The memory 112 includes memory areas of a local memory 200, a cache memory 201, and a shared memory 203. At least one of these memory areas may be an independent memory. The local memory 200 is used by the processor 111 which belongs to the same group as the memory 112 which includes the local memory 200.

The local memory 200 stores a snapshot creation program 210, a read program 211, a front-end write program 212, a back-end write program 213, a snapshot data defragmentation program 214, a garbage collection program 215, and a snapshot delete program 216. These programs will be described below.

In the cache memory 201, the data set written or read with respect to the PDEV 120 is stored temporarily.

The shared memory 203 is used by both the processor 111 belonging to the same group as the memory 112 which includes the shared memory 203, and the processor 111 belonging to a different group. The management information is stored in the shared memory 203.

The management information includes a volume management table 220, a directory area allocation management table 221, a directory tree management table 222, a snapshot generation management table 223, a page conversion table 224, a page allocation management table 225, a sub-block management table 226, and a search data management table 227.

These tables will be described later with reference to the drawings.

Figure 3:
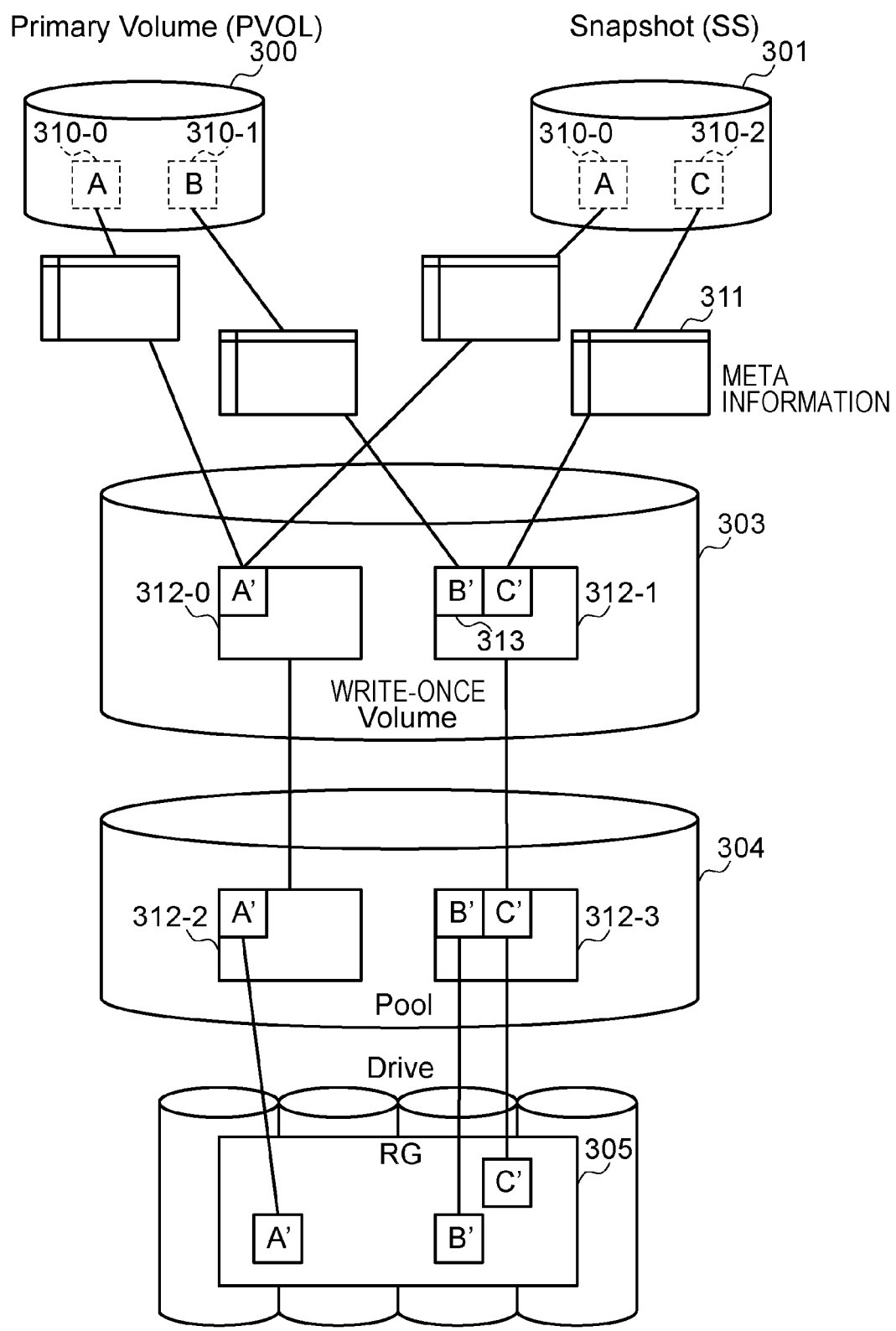
FIG. 3 is a diagram illustrating an example of a logical configuration in the storage system according to an embodiment.

FIG. 3 is a diagram illustrating an example of a logical configuration within the storage system 100. The storage system 100 is a storage system that uses a Redirect on Write (RoW) method when creating a snapshot. The storage system 100 includes a primary volume (PVOL) 300, a snapshot 301, a write-once volume 303, a pool 304, and a raid group (RG) 305 as logical configurations.

The PVOL 300 is a logical volume provided to a host device, and stores write data or reads and transfers data to the host device on the basis of a read/write request of the host device. The snapshot 301 is a duplicate volume of the PVOL 300 created by the RoW method, and is provided to the host device. The snapshot 301 can also be read and written from the host device if it is in the "SUSPEND (divided)" state in which data replication from the PVOL 300 is completed.

The write-once volume 303 is a logical volume for storing data written from the server system 102 as write-once. One PVOL 300 and one or more snapshots 301 are associated with one write-once volume 303.

The pool 304 is a logical storage area based on one or more RGs 305. The pool 304 includes a plurality of pages 312-$i$ ($i$=0, 1, ..., n−1). The RG 305 is a space of a RAID group which is configured by a plurality of PDEVs 120.

Hereinafter, an example of writing to the snapshot 301 in the SUSPEND (divided) state will be described.

When receiving a write request from the server system 102, the storage controller 110 compresses a data set C to be written, and writes the compressed data set C' to the page 312-1 allocated to the write-once volume 303 corresponding to the snapshot 301.

The page 312 is allocated from the pool 304 to the write-once volume 303, and the total capacity of the allocated pages 312 is the capacity used in the storage system 100. That is, the page 312-1 is the page 312 allocated to the write-once volume 303 corresponding to the snapshot 301, in other words, the page 312 indirectly allocated to the snapshot 301.

In the page 312-1, the compressed data set C' is stored in a write-once manner. A page allocated to the write-once volume 303 (a page indirectly allocated to the snapshot 301) can be referred to as an "write-once page".

In the following description, the area occupied by the compressed data set in the page 312-1 is referred to as "sub-block 313". In the page 312, a plurality of sub-blocks 313 are stored. The read processing and the write processing by the read/write request from the server system 102 are performed in units of sub-blocks. When all the sub-blocks 313 in the page 312 are unnecessary invalid data, it is possible to secure the capacity of the storage system 100 by releasing the storage area in units of pages.

Meta information 311 is a table that manages a storage destination address of the sub-block 313 in the write-once page corresponding to a logical data block 310 of the PVOL 300 or the snapshot 301. After once writing the compressed data set C', the reference destination address of the meta information 311 corresponding to the logical address of the logical data block "C" 310-2 is updated to the write-once address of the compressed data set C' in the write-once page 312-1, so that the data written in the snapshot 301 can be managed.

Figure 4:
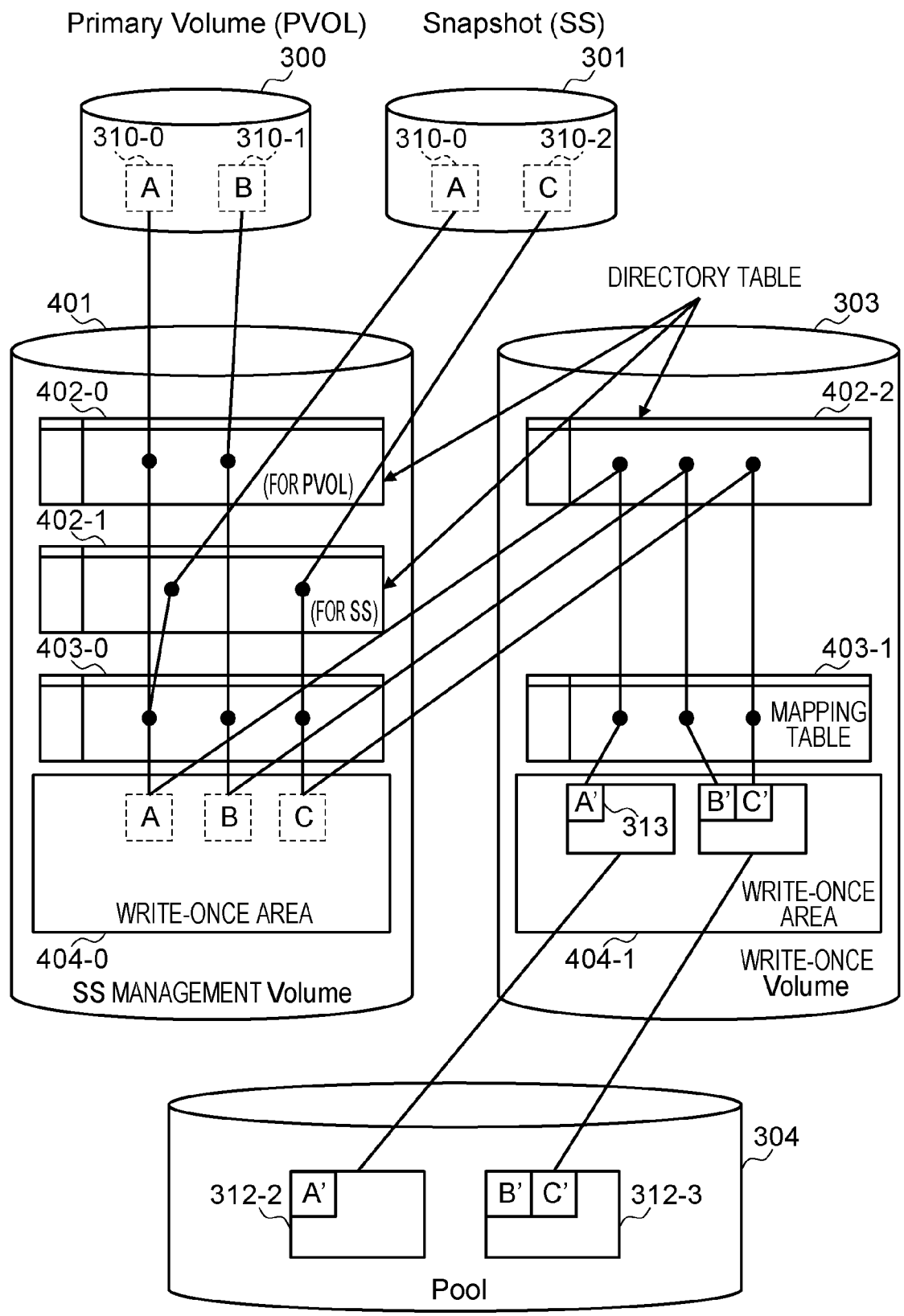
FIG. 4 is a diagram illustrating a detailed example of a logical configuration in the storage system according to the embodiment.

FIG. 4 is a diagram illustrating an example of a logical configuration in which meta information for managing a relationship between the logical data block 310 of the PVOL 300 or the snapshot 301 and the storage destination address of the sub-block 313 in the write-once page is described in detail.

The meta information 311 includes a directory table 402 and a mapping table 403. The directory table 402 and the mapping table 403 are stored in areas in a snapshot management volume 401 and the write-once volume 303.

The snapshot management volume 401 is a logical volume for managing a sharing relationship of data between the PVOL 300 and the snapshot 301.

The directory table 402-0 for PVOL is a table that is arranged in an area in the snapshot management volume and converts an in-PVOL address of the logical data block 310-$i$ ($i$=0, 1) of the PVOL 300 into an address in the snapshot management volume 401 in which the mapping table 403-0 is stored.

The directory table 402-1 for snapshot is a table which is arranged in an area in the snapshot management volume and converts an internal address of the logical data block 310-$i$ ($i$=0, 2) of the snapshot 301 into an address in the snapshot management volume 401 in which the mapping table 403-0 is stored. The directory table 402-1 for snapshot is a copy of the directory table 402-0 for PVOL. Further, the configuration of the table is the same as that of the directory table 402-0 for PVOL.

In addition, the mapping table 403-0 of the PVOL 300 and the snapshot 301 is arranged in the snapshot management volume 401. The mapping table 403-0 exists for each PVOL 300. The mapping table 403-0 is a table that converts the address in PVOL/snapshot of the logical data block 310-$i$ ($i$=0, 2, 3) into the address in a write-once area 404-0 of the snapshot management volume.

In this manner, information necessary for accessing the write-once area 404-0 from the PVOL 310 or the snapshot 301 is managed with the directory table 402 as a first layer and the mapping table 403 as a second layer.

Further, while the write-once volume 303 is a logical volume for storing data by write-once, the sub-block 313 compressed in a write-once area 404-1 of the write-once volume having an address different from the storage address of the logical data block 310 of a write-once area 404-0 of the snapshot management volume is stored by write-once. Therefore, a directory table 402-2 and a mapping table 403-1 are also arranged in the write-once volume 303. The directory table 402-2 and the mapping table 403-1 of the write-once volume are used to convert the address of the logical data block 310 of the write-once area 404-0 of the snapshot management volume into the address in the write-once area 404-1 of the write-once volume. In the garbage collection processing, when the sub-block 313 is copied, the directory table 402 and the mapping table 403 that manage the storage address of the sub-block also need to be updated to the copy destination address. Since there are the directory table 402-2 and the mapping table 403-1 also in the write-once volume, it is not necessary to update both the directory table 402-0 for PVOL and the directory table 402-1 for snapshot, which is efficient.

Hereinafter, an example of the table will be described.

Figure 5:
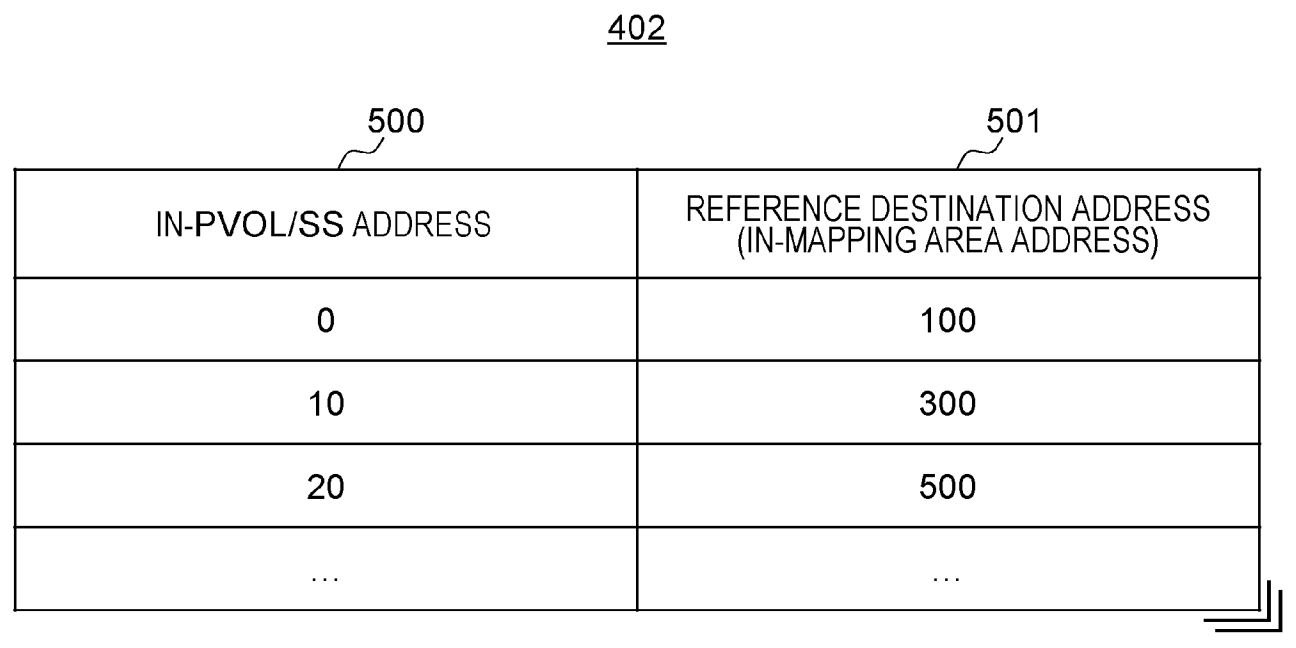

FIG. 5 is an explanatory diagram of a configuration of the directory table 402-$i$ ($i$=0, 1, 2). The directory table 402-0 for PVOL, the directory table 402-1 for snapshot, and the directory table 402-2 for write-once volume have the same configuration. One entry of each directory table 402 corresponds to data in units of granularity (for example, 256 KB) of logical data of the PVOL 300.

The directory table 402 includes an in-PVOL/Snapshot address 500 and a reference destination address (in-mapping area address) 501. The in-PVOL/Snapshot address 500 is a storage logical address of the target data in the PVOL 300 in the case of the directory table 402-0, is a storage logical address of the target data in the snapshot 301 in the case of the directory table 402-1, and is a storage logical address of the target data in the write-once area 404-0 of a snapshot management table in the case of the directory table 402-2. The reference destination address (in-mapping area address) 501 is pointer information to the mapping table 403.

The reference destination address (in-mapping area address) 501 corresponds to an in-mapping area address 600 of the mapping table 403 associated with the directory table 402.

FIG. 6 is an explanatory diagram of a configuration of a mapping table 403-0 for snapshot management. The mapping table 403-0 has an in-mapping area address 600 and a reference destination address (in-write-once area address) 601.

The in-mapping area address 600 is the reference destination address (in-mapping area address) 501 of the directory table 402-$i$ ($i$=0, 1) associated with the mapping table 403-0. The reference destination address (in-write-once area address) 601 is an address in the write-once area 404-0 in which the target data is stored.

FIG. 7 is an explanatory diagram of a configuration of the mapping table 403-1 for write-once volume. The mapping table 403-1 includes an in-mapping area address 700, a reference destination address (in-write-once area address) 701, a post-compression capacity 702, and a snapshot #703.

The in-mapping area address 700 is a reference destination address (in-mapping area address) 501 of the directory table 402-2 associated with the mapping table 403-1. The reference destination address (in-write-once area address) 701 is an address in the write-once area 404-1 in which the target data is stored. The post-compression capacity 702 is a data amount after compression when the target data of the PVOL 300 or the snapshot 301 is stored in the write-once area 404-1. The snapshot #703 is information set by the snapshot data defragmentation program 214 and is a number for uniquely specifying the snapshot 301 replicated from the PVOL 300.

FIG. 8 is an explanatory diagram of a configuration of the volume management table 220. The volume management table 220 is a table that manages the PVOL 300, the snapshot 301, and volumes such as the snapshot management volume 401 and the write-once volume 404. The volume management table 220 includes a VOL #/snapshot #800, an attribute 801, a PVOL #802, a directory #803, a VOL capacity 804, and a pool #805.

The VOL #800 is a number for identifying the volume. The attribute 801 is a type of volume identified by the VOL #800, and includes PVOL, snapshot, write-once, and the like. The PVOL #802 is a number for identifying the replication source PVOL of Snapshot. The directory #803 is a number for identifying a directory table allocated to PVOL or snapshot. For example, in FIG. 8, in the snapshot of which the snapshot # is 2, the replication source PVOL # is 0, and #5 is allocated to the directory table. The PVOL # and the directory # of the snapshot management volume 401 and the write-once volume 303 are NULL.

The capacity 804 is the capacity of the volume identified by the VOL #800. The pool #805 is a pool number from which a volume identified by the VOL #800 is cut out.

FIG. 9 is an explanatory diagram of a configuration of the directory area allocation management table 221. The directory area allocation management table 221 is a table that manages the volume or the snapshot to which a directory #900 is allocated in association with an allocation destination VOL/snapshot #901.

Figure 10:
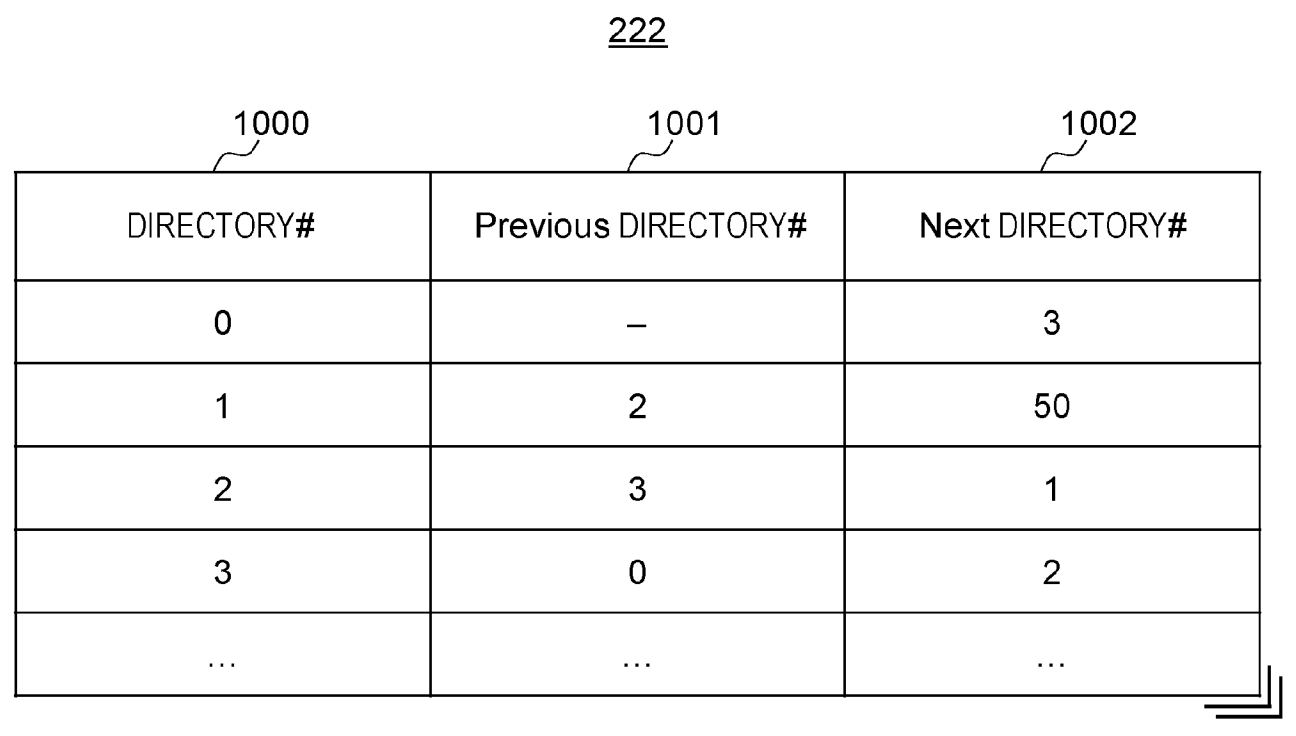

FIG. 10 is an explanatory diagram of a configuration of the directory tree management table 222. The directory tree management table 222 is a table that manages the directory # of a created Snapshot in the order of creation. For example, in FIG. 10, in a case where a directory #1000 of a certain snapshot is 2, it is managed that the directory # (previous directory #1001) of a snapshot one generation older than the snapshot is 1, and the directory # (next directory #1002) of a snapshot one generation older than the snapshot is 3.

FIG. 11 is an explanatory diagram of a configuration of the snapshot generation management table 223. In the snapshot generation management table 223, the latest generation of snapshot is managed for each PVOL # of the PVOL 300 that is the replication source. The snapshot generation management table 223 includes a PVOL #1100, a latest generation #1101, a generation #1102, a snapshot creation time 1103, a snapshot #1104, a state 1105, and a defragmentation flag 1106. The snapshot generation management table 223 manages, for example, 1024 generations for each PVOL # (generation #=0 to 1023).

In the snapshot generation management table 223, the latest generation # is incremented every time a snapshot of each PVOL # is created, and the snapshot creation time 1103, the snapshot #1104, the state 1105, and the defragmentation flag 1106 corresponding to the latest generation #1101 are updated. In the state 1105, there is a PAIR that synchronizes data of PVOL and snapshot while disabling I/O with respect to snapshot after creating snapshot of PVOL. In addition, in the state 1105, there is SUSPEND (division) in which data of PVOL and snapshot are not synchronized and I/O for snapshot is possible. The defragmentation flag 1106 manages whether the snapshot data defragmentation program 214 is executed for the snapshot 301, and is updated to an uncompleted state after the snapshot is created.

FIG. 12 is an explanatory diagram of a configuration of the page conversion table 224. The page conversion table 224 is set for each volume such as a PVOL or a write-once volume. The page conversion table 224 holds, for example, information regarding a relationship between an area (for example, a page 312-0) in the write-once volume 303 and a page 312-2.

For example, the page conversion table 224 has an entry for each area in the write-once volume 303. Each entry stores information such as an in-VOL address 1200, an allocation flag 1201, a page #1202, and a GC unnecessary flag 1203. Hereinafter, one area (referred to as a "target area") will be described as an example.

The in-VOL address 1200 is information of the logical address (for example, the head logical address) of the target area. The allocation flag 1201 is information indicating whether the page 312-2 is allocated to the target area ("allocated") or not ("unallocated"). The page #1202 is information of the number of the page 312-2 allocated to the target area. The GC unnecessary flag 1203 is information indicating whether the page does not require GC processing ("unnecessary") or the page requires processing ("necessary").

FIG. 13 is an explanatory diagram of a configuration of the page allocation management table 225. The page allocation management table 225 is set for each pool 304. The page allocation management table 225 stores information related to a relation between the page 312-2 and an allocation destination. For example, the page allocation management table 225 has an entry for each page 312-2.

Each entry includes information of a page #1300, an allocation flag 1301, an allocation destination VOL #1302, and an allocation destination in-VOL address 1303. Hereinafter, one page 312 (referred to as a "target page") will be described as an example. The page #1300 is information of the number of the target page. The allocation flag 1301 is information indicating whether the target page is allocated ("allocated") or not ("unallocated").

The allocation destination VOL #1302 is information of the number of the allocation destination VOL (write-once volume 303) of the target page. The allocation destination in-VOL address 1303 is information of the logical address (for example, the head logical address) of the area of the allocation destination VOL of the target page.

FIG. 14 is a diagram illustrating an example of the sub-block management table 226. The sub-block management table 226 is provided for each write-once volume 303. The sub-block management table 226 stores information related to the sub-block 313. For example, the sub-block management table 226 has an entry for each sub-block 313.

Each entry stores information such as a page #1400, an in-page address 1401, a sub-block size 1402, a reference source address 1403, and an allocation flag 1404. Hereinafter, the description will be given about an example of one sub-block 313 (referred to as "target sub-block").

The page #1400 is information of the number of the page 312-0 including the target sub-block. The in-page address 1401 is information of the logical address of the target sub-block in the page 312-0. The sub-block size 1402 is information of the size of the target sub-block (the size of the data set after compression which is stored in the target sub-block).

The reference source address 1403 is address information that refers to the target sub-block. The reference source address of the sub-block 313 of the write-once volume is an address in the write-once area 404-0 of the snapshot management volume. The allocation flag 1404 is information indicating whether the target sub-block is allocated ("allocated") or not ("unallocated"), in other words, whether the target sub-block is in use or unused.

FIG. 15 is a diagram illustrating an example of the search data management table 227. The search data management table 227 is a table for temporarily holding the processing target data searched by the snapshot data defragmentation program 214. The number of entries is the same as the number of searched processing target data, and includes data #1500 of the data and an address (in-write-once area address) 1501 which is a data storage destination thereof.

Figure 16:
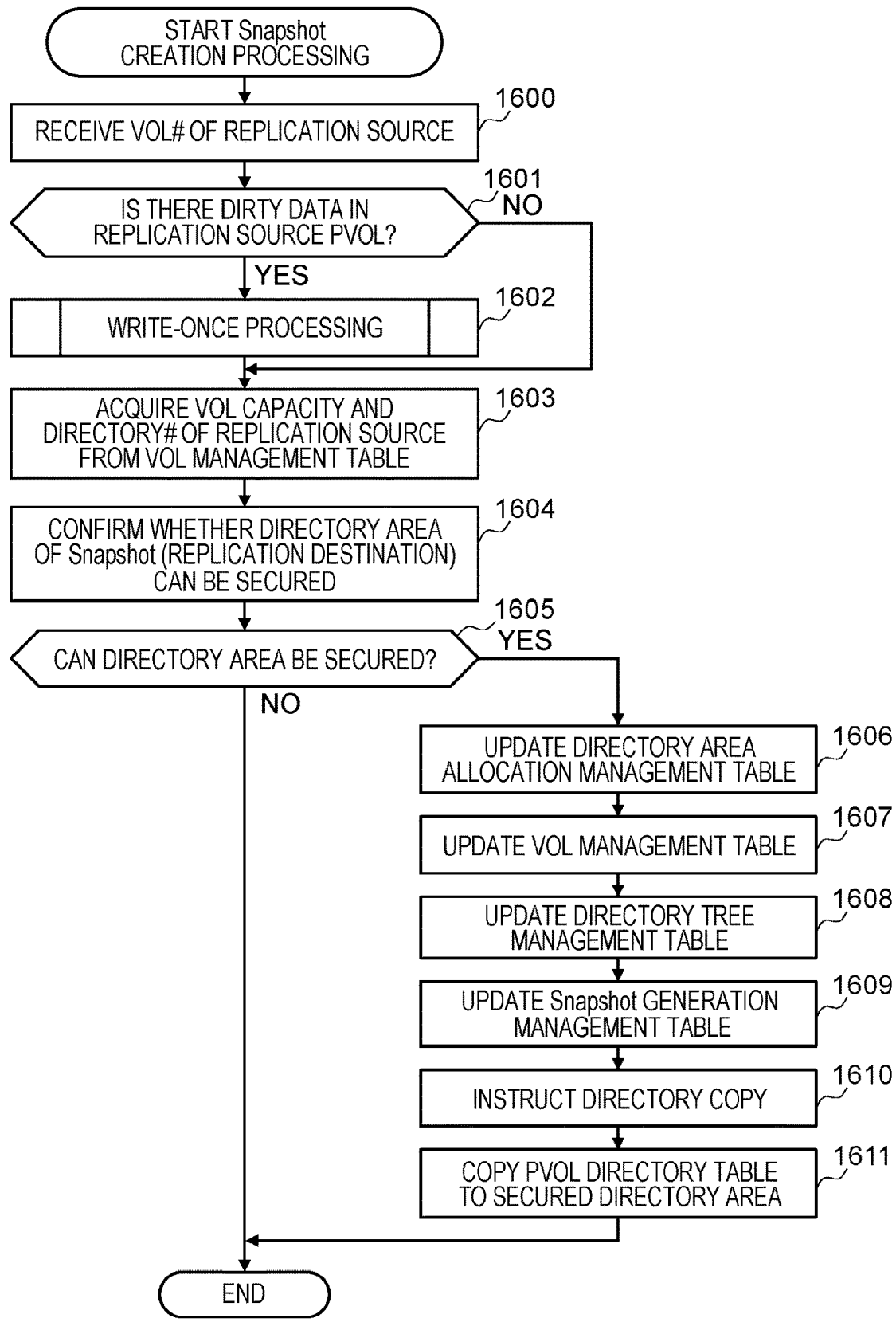
FIG. 16 is a flowchart illustrating a processing procedure of snapshot creation processing.

FIG. 16 is a flowchart illustrating a processing procedure of snapshot creation processing. The snapshot creation processing is a process of replicating data of the PVOL 300 which is the replication source VOL to the snapshot 301. In the ROW method, the user data is not copied, and the PVOL directory table 402-0 that manages the data storage destination address is copied to the snapshot directory table 402-1, so that the data of the PVOL 300 can be referred from the snapshot 301, and it is possible to show as if the data has been copied to the snapshot 301. The snapshot creation processing is executed by the snapshot creation program 210 in response to an instruction from the management system 103.

First, in 1600, the snapshot creation program 210 receives VOL # of the replication source VOL that is the PVOL of the snapshot creation target. Next, in 1601, the snapshot creation program 210 determines whether dirty data that has not been de-staged to the replication source VOL received in 1600 exists in the cache memory 201. The snapshot creation program 210 moves the process to 1602 when there is dirty data that has not been de-staged to the replication source VOL (Yes in 1601), and transfers the process to 1603 when there is no dirty data (No in 1601). In 1602, the snapshot creation program 210 performs write-once processing of dirty data, and details thereof will be described later with reference to FIG. 17.

In 1603, the snapshot creation program 210 acquires the capacity and the directory # of the replication source VOL from the volume management table 220. Next, in 1604, the snapshot creation program 210 confirms whether a directory area of snapshot (replication destination) which is a copy of the replication source VOL can be secured by the snapshot management volume 401. The snapshot creation program 210 moves the process to 1606 when a directory area for snapshot (replication destination) can be secured (Yes in 1605), and ends the snapshot creation processing when the directory area cannot be secured (No in 1605).

In 1606, the snapshot creation program 210 allocates a directory # for snapshot with reference to the directory area allocation management table 221, and updates the allocation destination snapshot # of the allocated directory #. Next, in 1607, the volume information including PVOL #, directory #, capacity, and pool # of the attribute=Snapshot created by the snapshot creation processing is additionally written to the volume management table 220 and updated.

Next, in 1608, the snapshot creation program 210 updates a previous directory #1001 and the next directory #1002 of the target directory # of the directory management table so that the created directory # of snapshot is connected to a location located closest to the next side of the directory tree management table 222. In addition, the next directory # of the directory # of the old snapshot of one generation located closest to the next side before the update is updated to the directory # of the created snapshot.

Next, in 1609, the snapshot creation program 210 increments the latest generation #1101 of the created snapshot by +1, sets the snapshot creation time 1103, the snapshot #1104 (corresponding to VOL # of the volume management table 220), the state 1105=SUSPEND, and the defragmentation flag 1106=Uncompleted, and updates the snapshot generation management table 223.

Next, in 1610, the snapshot creation program 210 instructs the storage controller 110 to perform directory copy. Next, in 1611, the snapshot creation program 210 receives an instruction of directory copy of 1610, and copies the directory table 402-0 of the PVOL as the replication source VOL to the directory area secured in 1606. The directory table 402-1 created by the copy is referred to in the I/O processing of the created snapshot.

Figure 17:
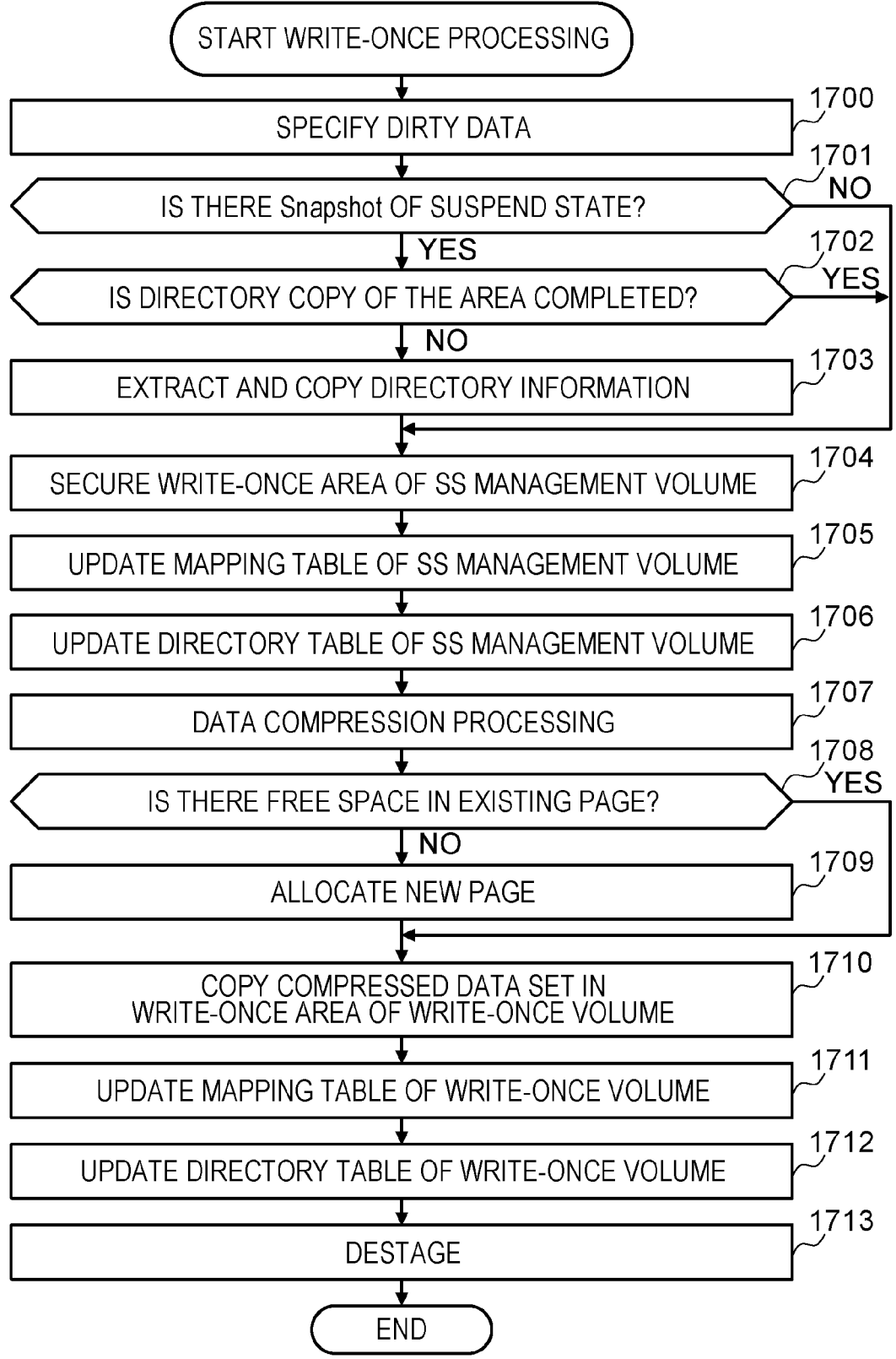
FIG. 17 is a flowchart illustrating a processing procedure of write-once processing.

FIG. 17 is a flowchart illustrating a processing procedure of write-once processing. The write-once processing is a process of transferring the data stored in the cache memory 201 of the storage system by front-end write program 212 to the write-once volume 303 to additionally write the data, and updating the directory table 402 and the mapping table 403 so as to refer to the additionally written data. FIG. 17 illustrates details of each write-once processing executed in 1602 of FIG. 16, 1904 of FIG. 19, and 2001 of FIG. 20. Hereinafter, the snapshot creation program 210 will be described as a processing subject as write-once processing executed in 1602 of FIG. 16.

Figure 19:
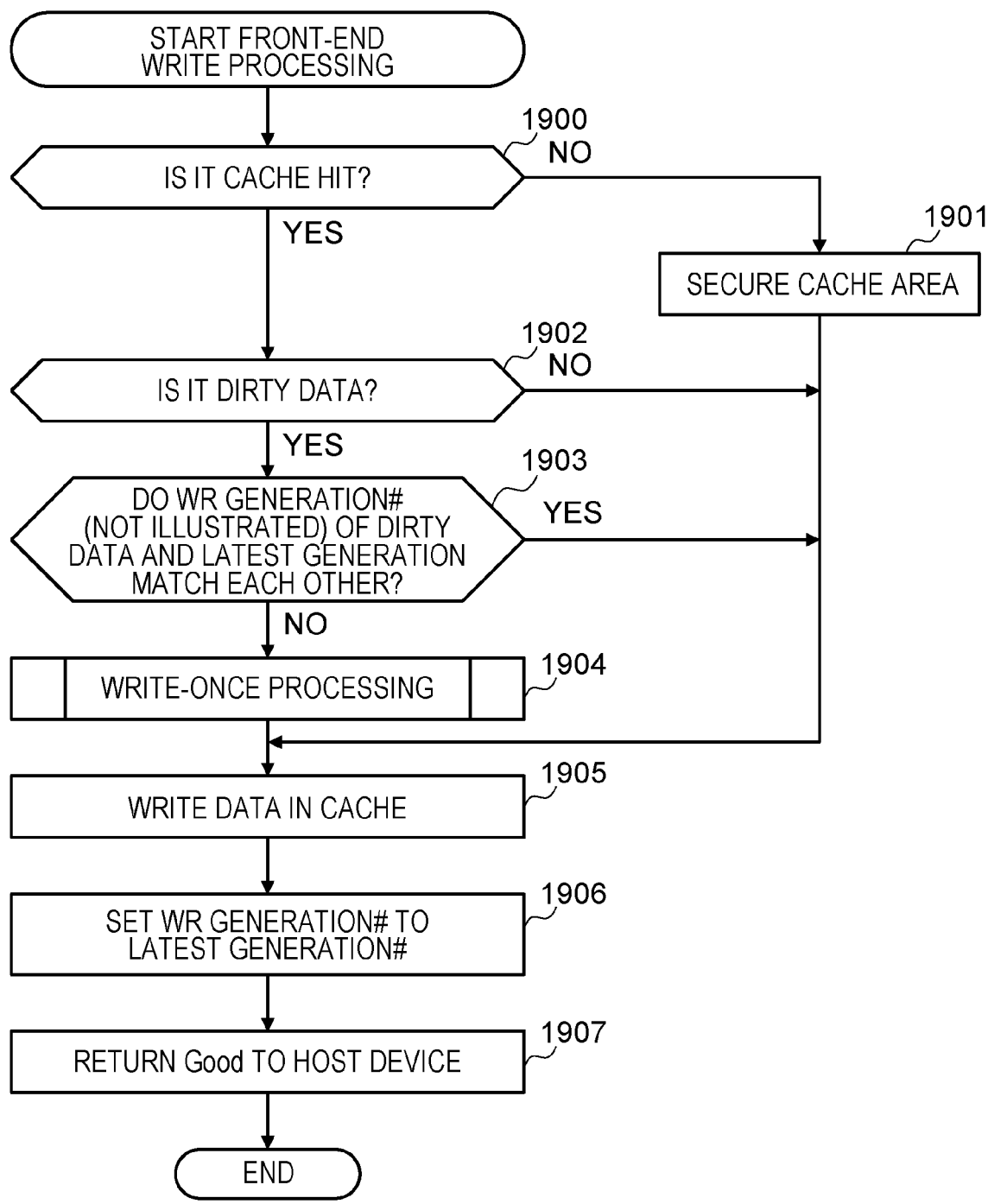
FIG. 19 is a flowchart illustrating a processing procedure of front-end write processing.
Figure 20:
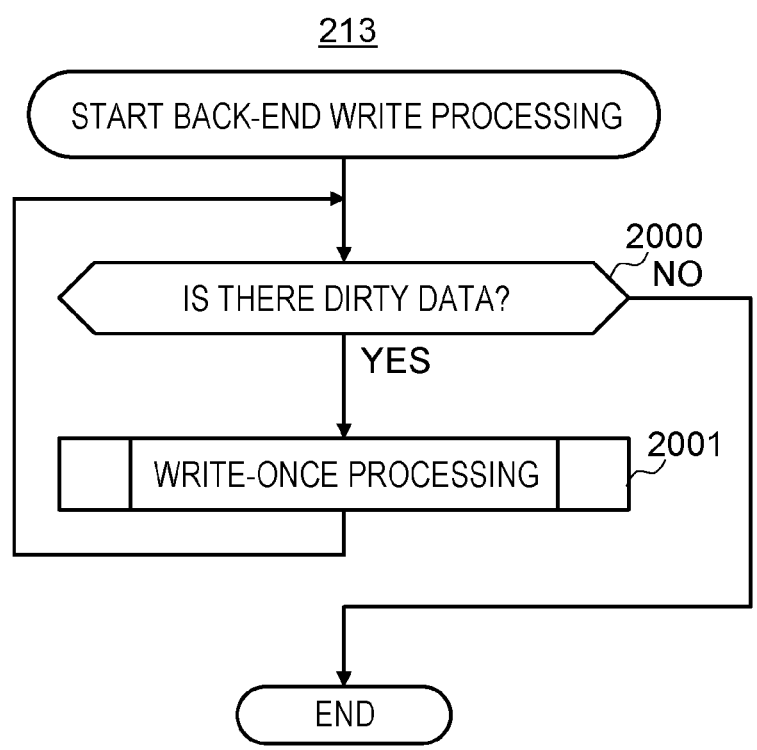
FIG. 20 is a flowchart illustrating a processing procedure of back-end write processing.

Note that the front-end write program 212 in 1904 of FIG. 19 and the back-end write program 213 in 2001 of FIG. 20 are the processing subjects.

First, in 1700, the snapshot creation program 210 specifies dirty data. Next, in 1701, the snapshot creation program 210 refers to the snapshot generation management table 223 and determines whether the PVOL has snapshot in the SUSPEND state. In a case where there is snapshot in the SUSPEND state, another snapshot creation program 210 may be in operation and directory copy is being performed, and thus the process proceeds to 1702. The snapshot creation program 210 moves a process to 1704 when there is no snapshot in the SUSPEND state (No in 1701), and moves the process to 1702 when there is snapshot in the SUSPEND state (Yes in 1701).

In 1702, the snapshot creation program 210 determines whether the directory copy corresponding to the logical address (LBA) of the dirty data as a write-once processing target is completed. If the write-once processing proceeds before the directory copy is completed, the directory table to be copied is updated, the directory copy cannot be performed, and the snapshot cannot be performed. When the directory copy is completed (Yes in 1702), the snapshot creation program 210 moves the process to 1704, and when the directory copy is not completed (No in 1702), the snapshot creation program exports and copies the directory information of the area (1703). The exporting copy is a process of copying only the directory information of the write-once processing target area in a pinpoint manner when the write-once processing is performed on a non-copied area in the copy processing in 1611 of FIG. 16.

Next, in 1704, the snapshot creation program 210 secures an area of the write-once area 404-0 of the snapshot management volume corresponding to the logical address (LBA) of the dirty data of the write-once processing target. Next, in 1705, the snapshot creation program 210 holds the storage position in the write-once area secured in 1704 in an unused entry in which the reference destination address (in-write-once area address) 601 is not set among the entries of the mapping table 403-0 of the snapshot management volume. That is, the secured write-once area address is set to the reference destination address (the in-write-once area address) 601. Next, in 1706, the snapshot creation program 210 sets the in-mapping area address 600 of the mapping information created in 1705 to the reference destination address (in-mapping area address) 501 in the entry corresponding to the logical address (LBA accessible from the host) of the data among the entries of the directory table 402-1.

Next, in 1707, the snapshot creation program 210 compresses the dirty data specified in 1700. Next, in 1708, the snapshot creation program 210 determines whether there is a free space in the write-once page 312-0 of the write-once volume which is the transfer destination of the compressed data. The snapshot creation program 210 moves the process to 1710 when there is a free space (Yes in 1708), and allocates a new write-once page from the pool 304 when there is no free space (No in 1708). Next, in 1710, the snapshot creation program 210 copies the compressed data set compressed in 1707 to the write-once area 404-1 of the write-once volume corresponding to the replication source volume. Next, in 1713, the snapshot creation program 210 de-stages the dirty data copied to the write-once area in 1710 and stores the data in the drive.

Figure 18:
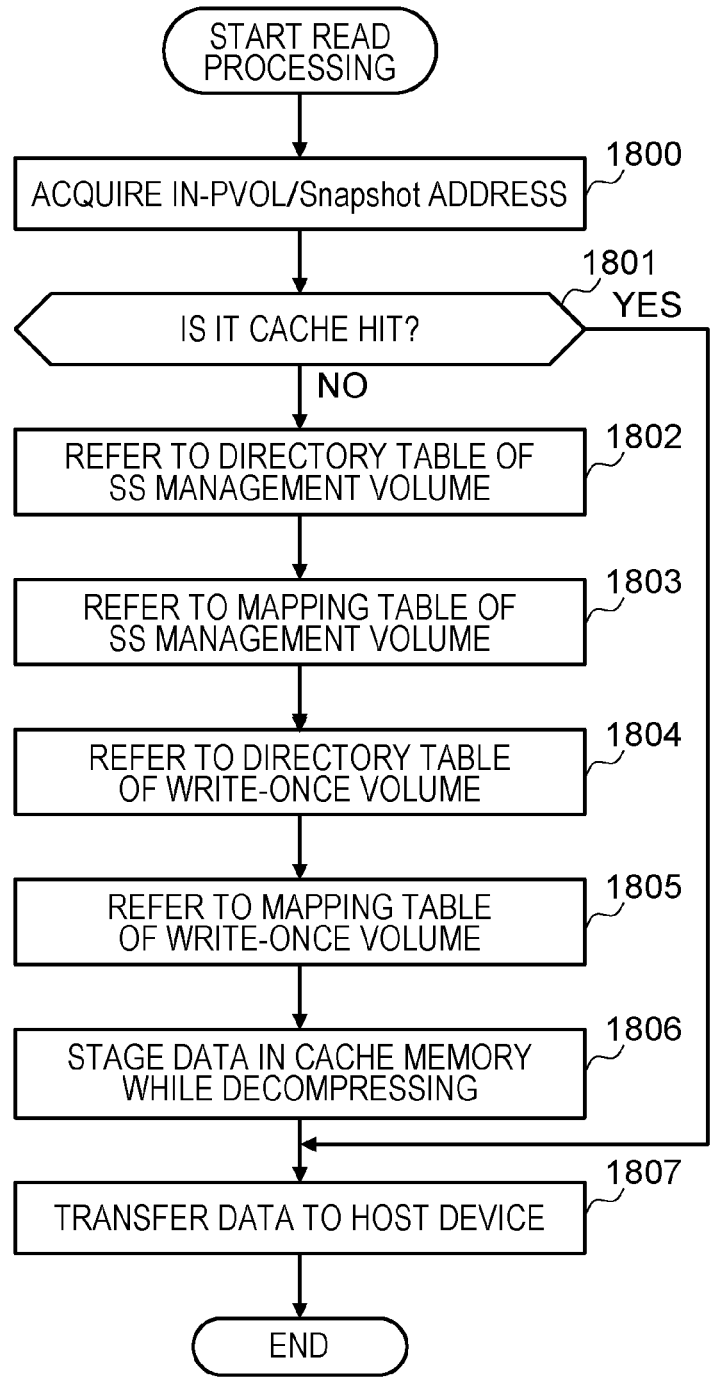
FIG. 18 is a flowchart illustrating a processing procedure of read processing.

FIG. 18 is a flowchart illustrating a processing procedure of read processing. The read processing is executed by the read program 211 in response to a read request from the host device.

In 1800, the read program 211 acquires an address in PVOL or snapshot of data targeted by the read request from the server system 102. Next, in 1801, the read program 211 determines whether the target data of the read request is to be a cache hit. The read program 211 moves the process to S1807 when the target data of the read request is a cache hit (Yes in 1801), and moves the process to 1802 when the target data of the read request is not a cache hit (No in 1801).

In 1802, the read program 211 refers to the directory tables 402-0 and 402-1 of the snapshot management volume, and acquires the reference destination address (in-mapping area address) 501 based on the address in PVOL/Snapshot acquired in 1800. The read program 211 refers to the directory table 402-0 for PVOL when the target data of the read request is data in the PVOL 300, and refers to the directory table 402-1 for snapshot when the target data of the read request is data in the snapshot 301.

Next, in 1803, the read program 211 refers to the snapshot management volume mapping table 403-0, and acquires the reference destination address (in-write-once area address) 601 based on the reference destination address (in-mapping area address) acquired in 1802.

Next, in 1804, the read program 211 refers to the directory table 402-2 of the write-once volume corresponding to the reference destination address (in-mapping area address of the snapshot management volume) acquired in 1803, and acquires the reference destination address (in-mapping area address) 501 of the write-once volume. Next, in 1805, the read program 211 refers to the write-once volume mapping table 403-1 and acquires the reference destination address (in-write-once area address) 701 based on the reference destination address (in-mapping area address) acquired in 1804.

Next, in 1806, the read program 211 stages the data stored in the in-write-once area address of the write-once volume specified in 1805 in the cache memory while decompressing the data.

Next, in 1807, the read program 211 transfers the data for which the cache hit is made in 1801 or the data staged in 1806 to the host device.

FIG. 19 is a flowchart illustrating a processing procedure of the front-end write processing (common PVOL/Snapshot). The front-end write processing is a process of writing write data to the cache memory 201 of the storage system in synchronization with the write request when a write request is received from the host device. On the other hand, the back-end write processing described with reference to FIG. 20 is a process of transferring the write data (dirty data) on the cache memory 201 to the write-once area 404-1 of the write-once volume and storing the write data in the drive. The front-end write processing is executed by the front-end write program 212 when a write request for the PVOL 300 or the snapshot 301 is received from the host device.

First, in 1900, the front-end write program 212 determines whether the target data of the write request from the host device is subjected to a cache hit. The front-end write program 212 moves the process to 1902 when the target data of the write request is a cache hit (Yes in 1900), and moves the process to 1901 when the target data of the write request is not a cache hit (No in 1900). In 1901, the front-end write program 212 reserves a cache area in the cache memory 201.

In 1902, the front-end write program 212 determines whether the target data for which the cache hit in 1900 is dirty data. The front-end write program 212 moves the process to 1903 when the target data for which the cache hit in 1900 is the dirty data (Yes in 1902), and moves the process to 1905 when the target data is not the dirty data (No in 1902).

In 1903, the front-end write program 212 determines whether the WR (WRight) generation # of the dirty data determined in 1902 and the generation # of the target data of the write request matches each other. The WR generation # is held in cache data management information (not illustrated). In addition, the generation # of the target data of the write request is acquired from the latest generation #1101 of FIG. 11. In 1903, it is prevented that the dirty data is updated with the target data of the write request and the data of the snapshot is written while the write-once processing of the target data (dirty data) of the snapshot obtained immediately before is not performed. The front-end write program 212 moves the process to 1905 when the WR generation # and the latest generation # match (Yes in 1903), and moves the process to 1904 when the WR generation # and the latest generation # do not match (No in 1903).

In 1904, the front-end write program 212 executes the write-once processing described with reference to FIG. 17. in 1904, the dirty data of the WR generation #which does not match the latest generation # is written to the write-once area and de-staged from the cache memory 201.

In 1905, the front-end write program 212 writes the target data of the write request to the cache area secured in 1901 or the cache area in which the dirty data requiring the write-once processing can be generated again by performing the write-once processing on the dirty data.

In 1906, the front-end write program 212 sets the WR generation # of the cache data written to the cache memory 201 in 1905 to the latest generation # compared in 1903. In 1907, the front-end write program 212 returns a normal response (Good response) to the host device.

FIG. 20 is a flowchart illustrating a processing procedure of the back-end write processing. The back-end write processing is a process of writing the unreflected data in the writing area 106 in a case where there is data (dirty data) not reflected in the write-once area 404-1 of the write-once volume 303 on the cache memory 201. The back-end write processing is performed in synchronization or asynchronization with the front-end processing. The back-end write processing is performed by the back-end write program 213.

First, in 2000, the back-end write program 213 determines whether dirty data is present in the cache memory 201. The back-end write program 213 moves the process to 2001 when there is dirty data in the cache memory 201 (Yes in 2000), and ends the back-end write processing when there is no dirty data (No in 2000). In 2001, the back-end write program 213 executes the write-once processing described with reference to FIG. 17.

Figure 21:
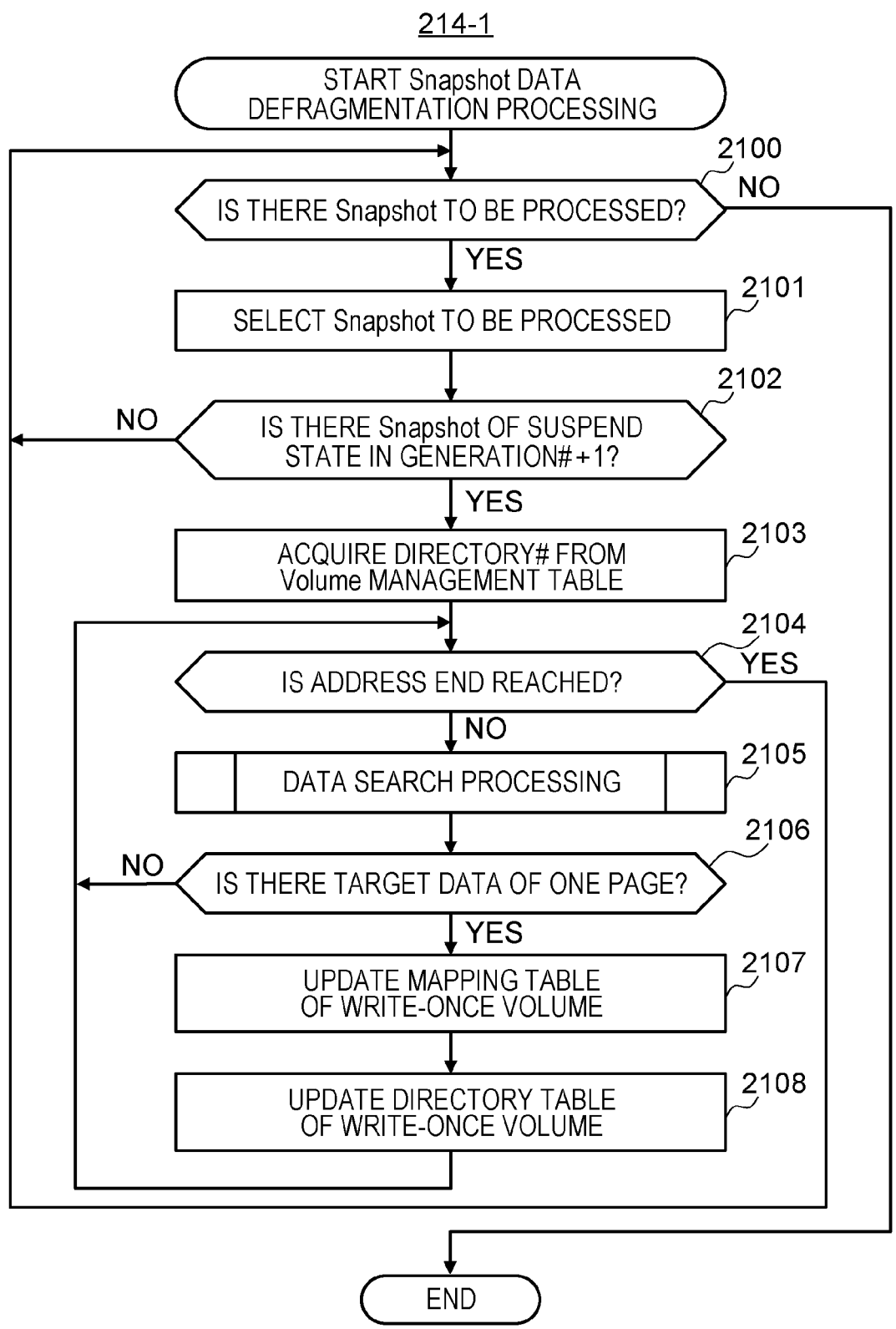
FIG. 21 is a flowchart illustrating a processing procedure of snapshot data defragmentation processing according to the first embodiment.

FIG. 21 is a flowchart illustrating a processing procedure of snapshot data defragmentation processing according to the first embodiment. Snapshot data defragmentation processing 214-1 is started as a trigger of an instruction of the snapshot creation processing from the management system 103 or as a periodic asynchronous process, and performs a process of searching for differential data of snapshot and setting the searched differential data as a copy target.

First, in 2100, the snapshot defragmentation program 214-1 refers to the snapshot generation management table 223 and determines whether there is a snapshot for which defragmentation processing has not been performed, in which the state 1105 is the SUSPEND state and the defragmentation flag 1106 has not been completed. When there is a snapshot for which defragmentation processing has not been performed yet (Yes in 2100), the process proceeds to 2101, and when there is no snapshot for which defragmentation processing has not been performed yet (No in 2100), this snapshot data defragmentation processing is ended. In 2101, snapshot for which no snapshot data defragmentation processing has been performed is selected.

Next, in 2102, the snapshot defragmentation program 214-1 determines whether there is a snapshot in the SUSPEND state in the new generation of the snapshot selected in 2101 with reference to the snapshot generation management table. In a case where there is snapshot in the SUSPEND state (Yes in 2102), the process proceeds to 2103, and in a case where there is no snapshot in the SUSPEND state (No in 2102), the process is performed again from 2100. For example, the generation #1102 with the snapshot #1104 of 100 is 4, and there is the snapshot #200 with the generation #1102 of 5 and the state 1105 of the SUSPEND state as a new generation of snapshot. Therefore, the snapshot with the snapshot #1104 of 100 can perform the process of 2103. According to this determination, since there is snapshot in the new generation, the differential data amount of the processing target snapshot is unchanged, and it is not necessary to perform the same processing again.

In 2103, the snapshot defragmentation program 214-1 acquires the directory #803 for identifying the directory table of the processing target snapshot from the volume management table 220.

In the process after 2104, the process is looped from the head of the logical address of the processing target snapshot to the end address. In 2104, the snapshot defragmentation program 214-1 determines whether the end of the logical address has been reached. When the end has been reached (Yes in 2104), the defragmentation processing for the processing target snapshot ends, and the process is performed again for another snapshot from the 2100 process. In a case where the end has not been reached (No in 2104), the process proceeds to 2105. In 2105, the snapshot defragmentation program 214-1 performs a process of searching for defragmentation target data, which will be described later in detail with reference to FIG. 22.

In 2106, a snapshot defragmentation program 214-1 determines whether there is an amount of one page of the defragmentation target data searched by 2105. In a case where there is an amount of one page (Yes in 2106), the defragmentation target data can be neatly grouped into one page, and thus the process proceeds to 2107. In a case where there is no amount of one page (No in 2106), the process proceeds to 2104, and the data search processing is continued.

In 2107 and 2108, by setting snapshot # to data determined as a defragmentation target, the garbage collection processing (FIG. 23) of actually copying and collecting differential data can determine which data is to be collected as differential data of which snapshot.

Next, in 2107, the snapshot defragmentation program 214-1 updates the write-once volume mapping table 403-1 corresponding to the defragmentation target data as a preparation processing of collecting the defragmentation target data for one page. By setting snapshot # to be processed in the snapshot #703 of the write-once volume mapping table 403-1, it is possible to determine which snapshot the defragmentation target data is.

In 2108, since the reference destination address (in-mapping area address) 501 of the directory table 402-2 of the write-once volume changes due to the update of the mapping table of 2107, the snapshot defragmentation program 214-1 performs the update. The address (in-mapping area address) of the mapping table updated in 2107 is set to the reference destination address (in-mapping area address) 501 of the directory table 402.

Information setting has been performed by the snapshot data defragmentation processing so that the defragmentation target data can be searched and the data can be discriminated. A process of copying and collecting the defragmentation target data will be described in garbage collection processing (FIG. 23) described later.

Figure 22:
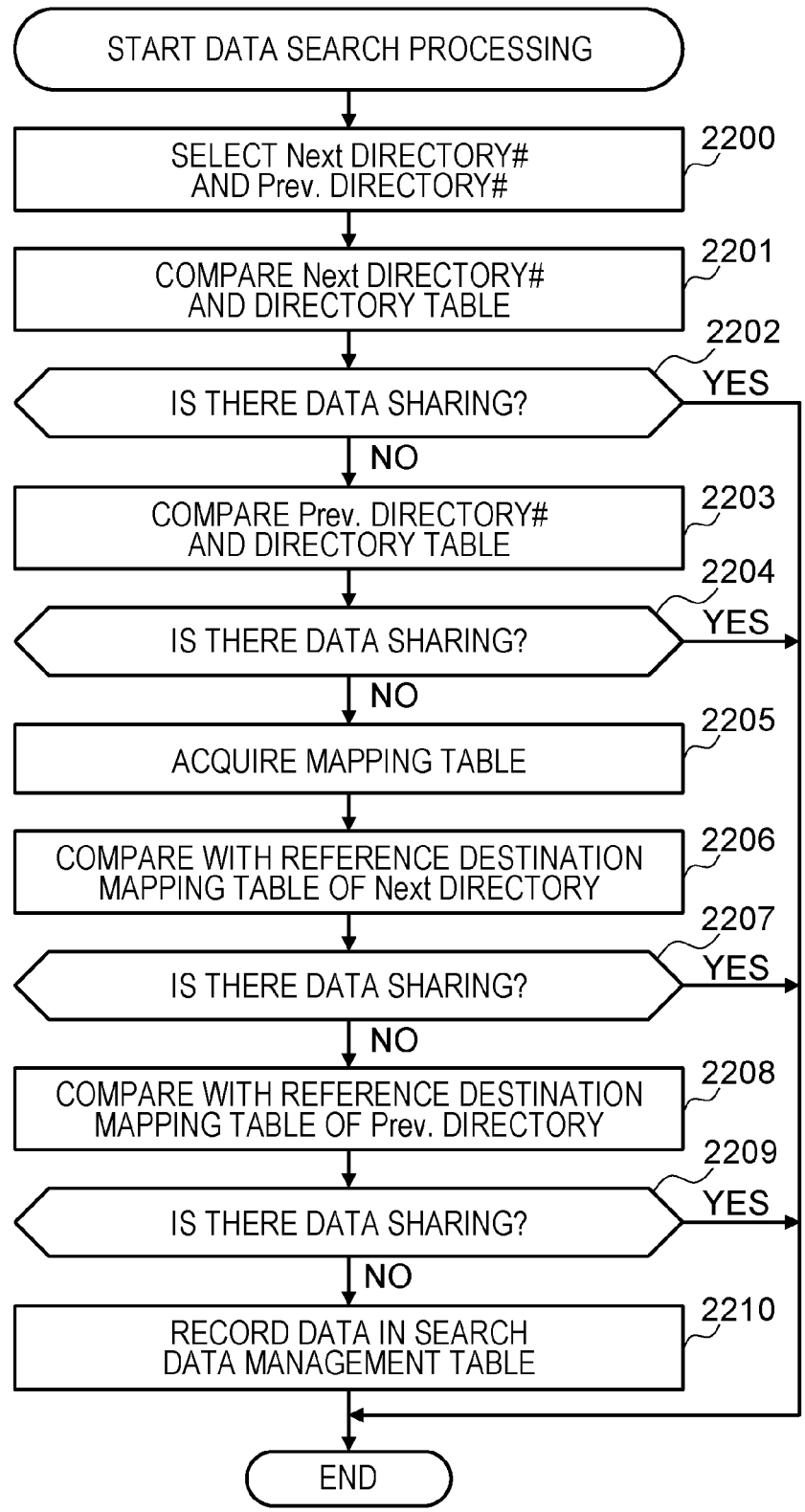
FIG. 22 is a flowchart illustrating a processing procedure of data search processing according to the first embodiment.

FIG. 22 is a flowchart illustrating a processing procedure of the data search processing of the first embodiment. FIG. 22 illustrates details of each data search processing executed in 2105 of FIGS. 21 and 2406 of FIG. 24. Hereinafter, as the data search processing executed in 2105 of FIG. 21, a snapshot data defragmentation program 214-1 will be described as a processing subject.

Figure 24:
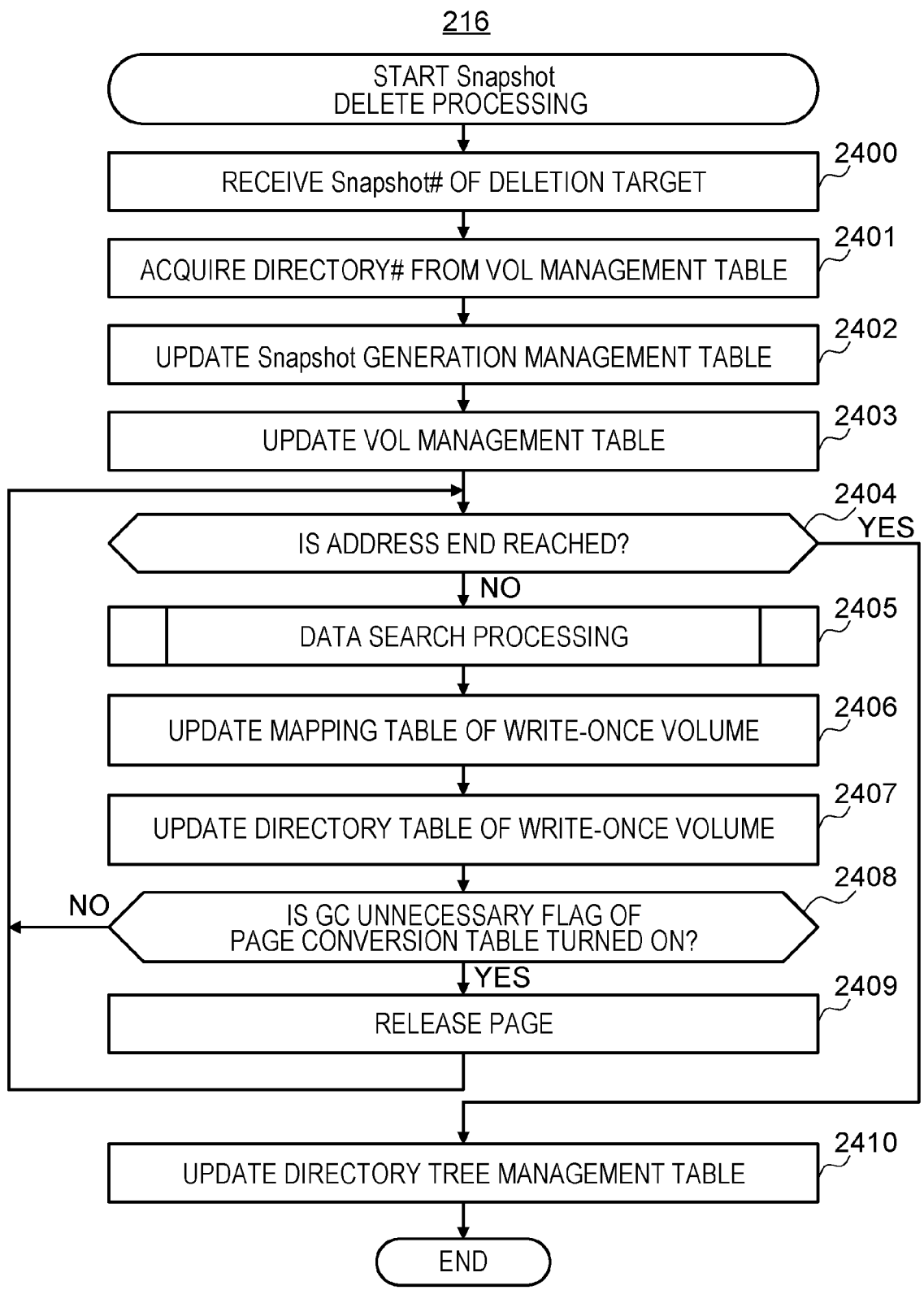
FIG. 24 is a flowchart illustrating a processing procedure of snapshot delete processing.

Note that, in 2406 of FIG. 24, the snapshot delete program 216 serves as a processing subject. A data search program 2105-1 is a program that compares data of the search target snapshot with a new generation of snapshot of the search target snapshot, and data of the search target snapshot with an older generation of snapshot of the search target snapshot, and records data referred to only by the search target snapshot as defragmentation target data in the data management table.

First, in 2200, the snapshot data defragmentation program 214-1 selects a next directory # corresponding to the directory # of a new generation of snapshot of the search target snapshot with reference to the next directory #1002 of the directory tree management table 222. Similarly, the previous directory # corresponding to the directory # of the snapshot of the older generation of the search target snapshot is selected with reference to the previous directory #1001 of the directory tree management table 222.

In 2201, the snapshot data defragmentation program 214-1 compares the reference destination address (in-mapping area address) 501 of the directory table 402 of the next directory # acquired in 2200 with the reference destination address (in-mapping area address) 501 of the directory table 402 of the processing target snapshot.

In 2202, the snapshot data defragmentation program 214-1 determines whether the data of the processing target snapshot is shared with a new generation of snapshot. That is, when the reference destination address (in-mapping area address) 501 of the directory table 402 of the processing target snapshot does not match the reference destination address (in-mapping area address) 501 of the directory table 402 of the next directory # (No in 2202), the process proceeds to 2203, and when they match (Yes in 2202), the data search processing is ended.

In 2203, the snapshot data defragmentation program 214-1 compares the reference destination address (in-mapping area address) 501 of the directory table 402 of the previous directory # acquired in 2200 with the reference destination address (in-mapping area address) 501 of the directory table 402 of the processing target snapshot.

In 2204, the snapshot data defragmentation program 214-1 determines whether the data of the processing target snapshot is shared with a snapshot of an older generation by one generation. That is, when the reference destination address (in-mapping area address) 501 of the directory table 402 of the processing target snapshot does not match the reference destination address (in-mapping area address) 501 of the directory table 402 of the previous directory # (No in 2204), the process proceeds to 2205, and when they match (Yes in 2204), the data search processing is ended.

According to 2202 and 2204, it has been found that the same data is not shared since different reference destination addresses 501 are provided in units of granularity (for example, 256 KB) of logical data which is a management unit of a directory table. However, in a finer granularity unit of logical data of the mapping table 403-0 referred to by the directory table, there is a possibility that data is shared by the write-once area 404-0 of the snapshot management volume. In the subsequent processing, it is determined whether data is shared in units of the reference destination addresses (in-write-once area address) 601 of the snapshot management volume mapping table 403-0.

In 2205, the snapshot data defragmentation program 214-1 acquires the mapping table 403-0 of each of the reference destination address (in-mapping area address) 501 of the directory table 402 of the processing target snapshot, the reference destination address (in-mapping area address) 501 of the directory table 402 of the next directory #, and the reference destination address (in-mapping area address) 501 of the directory table 402 of the previous directory #.

In 2206, the snapshot data defragmentation program 214-1 compares the reference destination address (in-write-once area address) 601 of the mapping table 403-0 referred to by the next directory # acquired in 2205 with the reference destination address (in-write-once area address) 601 of the mapping table 403-0 referred to by the directory table of the processing target snapshot.

In 2207, the snapshot data defragmentation program 214-1 determines whether the data of the processing target snapshot is shared with a new generation of snapshot. That is, when the reference destination address (in-write-once area address) 601 of the mapping table 403-0 of the processing target snapshot does not match the reference destination address (in-write-once area address) 601 of the mapping table 403-0 referred to by the next directory # (No in 2207), the process proceeds to 2208, and when they match each other (Yes in 2207), the data search processing is ended.

In 2208, the snapshot data defragmentation program 214-1 compares the reference destination address (in-write-once area address) 601 of the mapping table 403-0 referred to by the previous directory # acquired in 2205 with the reference destination address (in-write-once area address) 601 of the mapping table 403-0 referred to by the directory table of the processing target snapshot.

In 2209, the snapshot data defragmentation program 214-1 determines whether the data of the processing target snapshot is shared with a snapshot of an older generation by one generation. That is, when the reference destination address (in-write-once area address) 601 of the mapping table 403-0 of the processing target snapshot does not match the reference destination address (in-write-once area address) 601 of the mapping table 403-0 referred to by the previous directory # (No in 2209), the process proceeds to 2210, and when they match each other (Yes in 2209), the data search processing is ended.

In 2210, the snapshot data defragmentation program 214-1 additionally writes the in-write-once area address of the snapshot management volume 401 of data referred to only by the processing target snapshot to the search data management table 227.

Figure 23:
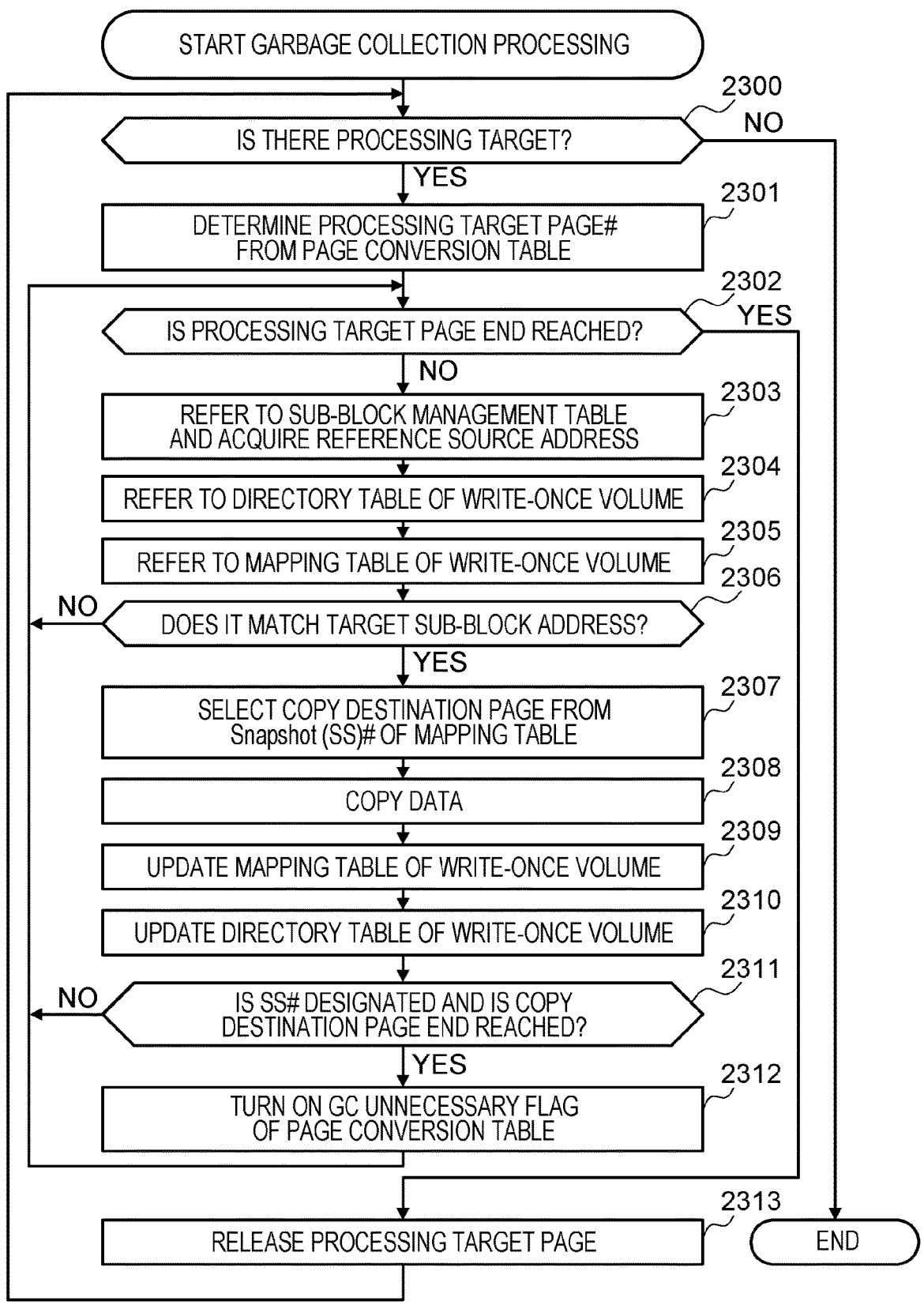
FIG. 23 is a flowchart illustrating a processing procedure of garbage collection processing of the first embodiment.

FIG. 23 is a flowchart illustrating a processing procedure of garbage collection (GC) processing of the first embodiment. The GC processing is a process of copying valid data in a page that is a unit of capacity management of the storage system to another page and releasing a page including only invalid data, thereby releasing the capacity of the storage system (the capacity of data stored in the drive) and securing a free space. First, in 2300, a GC program 215 selects a processing target volume from the volume management table. In a case where there is a processing target (Yes in 2300), the process proceeds to 2301, and in a case where there is no processing target (No in 2300), this garbage collection processing is ended.

Next, in 2301, the GC program 215 refers to the page conversion table 224 of the volume selected in 2300, and determines a processing target page. For example, the page #0 in which the allocation flag 1201 is already allocated and a GC unnecessary flag is necessary is selected as the processing target page.

In the subsequent process, the process is repeated from the head address to the end of the processing target page. In 2302, the GC program 215 determines whether the processing target page end has been reached. In a case where it has reached (Yes in 2302), the process proceeds to 2313, and in a case where it has not reached (No in 2302), the process proceeds to 2303.

In the process from 2303 to 2306, it is determined whether the sub-block 313 in the processing target page is valid data or invalid garbage. In the reference source address 1403 of the sub-block management table 226, the write-once area address of the SS management volume which refers to the sub-block is stored. In a case where the same sub-block in the page can be reached from the write-once area address of the stored SS management volume via the directory table 402-2 and the mapping table 403-1 (in a case where the addresses match each other), the reference source and the reference destination (sub-block) point to each other, thus it is determined as valid data. On the other hand, in a case where the sub-block of the reference destination is different due to the write processing, since the sub-block in the page is not referred to by anyone, it can be determined that the sub-block is garbage.

In 2303, the GC program 215 refers to the sub-block management table 226 corresponding to the sub-block 313 of the processing target page, and acquires the reference source address 1403 of the sub-block.

Next, in 2304, the GC program 215 refers to the directory table 402-2 of the write-once volume based on the reference source address (in-write-once area address of the snapshot management volume) acquired in 2303, and acquires the reference destination address (in-mapping area address) 501.

In 2305, the GC program 215 acquires the mapping table for the write-once volume from the in-mapping area address acquired in 2304.

Next, in 2306, the GC program 215 determines whether the reference destination address (in-write-once area address) 701 of the mapping table acquired in 2305 matches the address (the in-page address 1401 of the sub-block management table 226) storing the sub-block of the processing target page selected in 2303. In the case of matching (Yes in 2306), since the target sub-block is valid data referred from the logical address, the process proceeds to 2307. In the case of mismatching (No in 2306), since the target sub-block is garbage, the data copy is not performed and the process is resumed from 2302.

In 2307, the GC program 215 refers to the snapshot #703 of the write-once volume mapping table 403-1, and in a case where a valid value is set, the GC program selects a page # on which differential data of the snapshot # is collected. When the snapshot #703 is NULL, since it is not the defragmentation target data, the data copy destination page (write-once page) set by the GC program 215 is selected.

In 2308, the GC program 215 copies the sub-block of the valid data to the copy destination page selected in 2307.

Next, in 2309, since the sub-block is copied in 2308, the GC program 215 updates the target record of the write-once volume mapping table 403-1 which refers to the copied sub-block.

In 2310, since the reference destination address (in-mapping area address) 501 of the directory table 402-2 of the write-once volume changes due to the update of the mapping table in 2309, the GC program 215 performs the update. The address (in-mapping area address) of the mapping table updated in 2309 is set to the reference destination address (in-mapping area address) 501 of the directory table 402.

In 2311, the GC program 215 determines whether the data copied in 2308 is designated in the snapshot # and reaches the end of the copy destination page. In a case where the snapshot # is designated and the copy destination page has reached the end (Yes in 2311), the processing transitions to 2312, and in a case where the replication destination page has not reached the end (No in 2311), the process resumes from 2302.

In 2312, the GC program 215 sets the copy destination page as a GC processing-unnecessary page since the copy destination pages are spread with data referred to only by the specific snapshot by 2311. Specifically, the GC unnecessary flag 1203 of the page conversion table 224 is unnecessarily updated. As a result, it is not selected as a GC processing target thereafter, and copy becomes unnecessary.

In 2313, since all the valid data in the processing target page has been copied, the GC program 215 can release the processing target page including the garbage and secure the capacity of the storage system 100.

FIG. 24 is a flowchart illustrating a processing procedure of snapshot delete processing. The snapshot delete processing is executed by the snapshot delete program 216 in response to an instruction of snapshot deletion from the management system 103.

First, in 2400, the snapshot delete program 216 receives the snapshot # to be deleted. Next, in 2401, the snapshot delete program 216 acquires a directory # of the snapshot to be deleted from the volume management table 220.

In 2402, the snapshot delete program 216 deletes the deleted record of the snapshot from the snapshot generation management table 223.

Next, in 2403, the snapshot delete program 216 deletes the record of the volume corresponding to the deleted snapshot from the volume management table 220.

In the process from 2404 to 2409, the process is repeated from the head address to the end of the deletion target snapshot. In 2404, the snapshot delete program 216 determines whether the address end of the deletion target snapshot has been reached. In a case where the terminal is reached (Yes in 2404), the process proceeds to 2410, and in a case where the terminal is not reached (No in 2404), the process proceeds to 2405.

In 2405, the snapshot delete program 216 executes the data search processing described with reference to FIG. 22, and searches for data referred to only by the snapshot as a deletion target.

Next, in 2406, the snapshot delete program 216 deletes, from the write-once volume mapping table 403-1, a record of the write-once volume mapping table corresponding to data referred to by only the deletion target snapshot that can be subjected to the garbage inspection in 2405.

In 2407, the snapshot delete program 216 deletes the record of the directory table 402-1 which refers to the mapping table 403-1 deleted in 2406.

Next, in 2408, the snapshot delete program 216 determines whether the page of the reference destination address (in-write-once area address) 701 of the record of the mapping table 403-1 deleted in 2406 is the page of the GC unnecessary flag ON ("unnecessary") with reference to the page conversion table 224. When the GC unnecessary flag is ON ("unnecessary") (Yes in 2408), since the deletion target snapshot is put together in the target page, the GC processing is unnecessary and the page can be immediately released, and the capacity of the storage system 100 can be secured (2409). On the other hand, when the GC unnecessary flag is OFF ("necessary") (No in 2408), the page cannot be immediately released, and thus the process is resumed from 2404.

In 2410, the snapshot delete program 216 deletes the directory # of the deletion target snapshot from the directory tree management table since the garbage processing of the differential data of the deletion target snapshot has already been completed. Accordingly, the directory #referring to the deleted directory # as the next directory #1002 is updated to the next directory #1002 of the deleted directory #. Similarly, the directory #referred to as the deleted directory # as the previous directory #1001 is updated to the previous directory #1001 of the deleted directory #.

Figure 25:
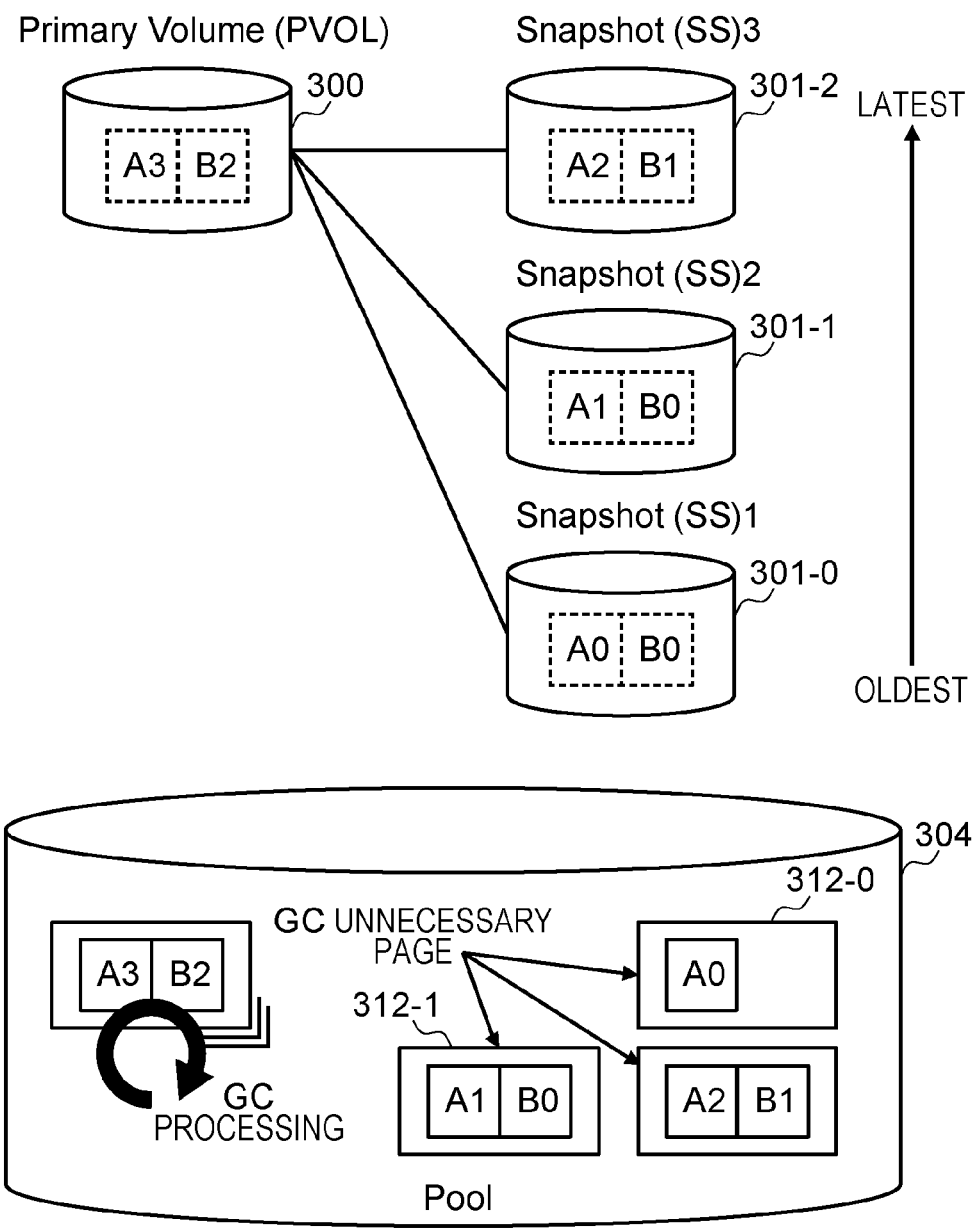
FIG. 25 is a diagram (part 1) for explaining the effects of the first embodiment.

Next, effects of the first embodiment will be described with reference to FIGS. 25 and 26. In the present embodiment, as illustrated in FIG. 25, for example, the differential data ("A0") referred to only by the snapshot 301-0 is moved to the GC unnecessary page, and it is not necessary to copy the differential data of snapshot in the GC processing, thereby suppressing an increase in the GC processing amount.

Figure 26:
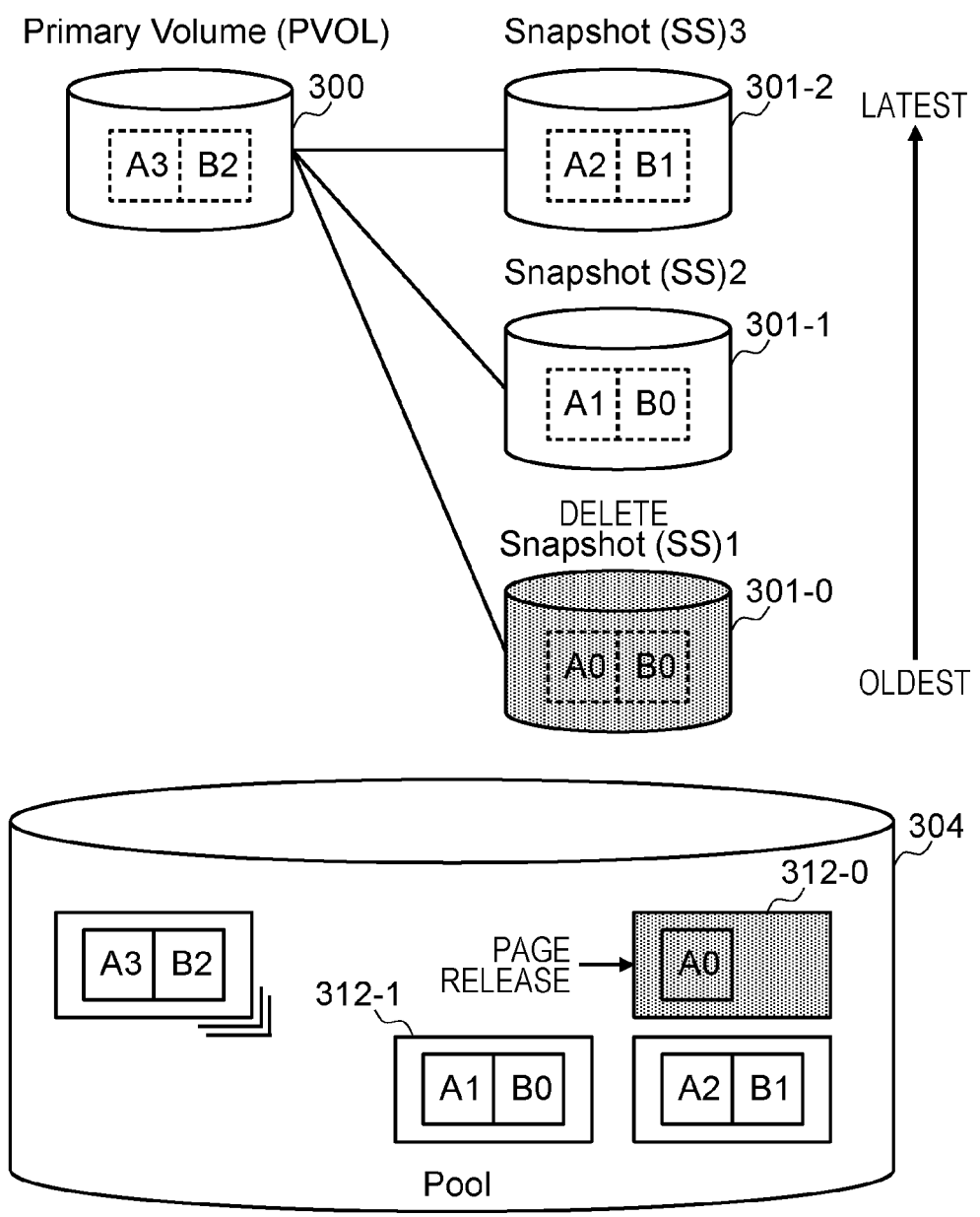
FIG. 26 is a diagram (part 2) for explaining the effects of the first embodiment.

In addition, in the present embodiment, as illustrated in FIG. 26, when a snapshot delete instruction of the snapshot 301-0 is issued, data ("A0") referred to only by the snapshot 301-0 is regarded as garbage by the snapshot delete program 216, but data referred to by the deletion target snapshot including the data ("A0") is put together in a GC unnecessary page. Therefore, the GC unnecessary page can be released without requiring the GC processing. Since the GC processing does not need to operate, I/O performance is not affected. In addition, the capacity of the storage system 100 can be immediately secured.

Second Embodiment

Next, a second embodiment of the present invention will be described using FIG. 27.

In the first embodiment, in the data search processing 2105-1 of the snapshot data defragmentation processing 214-1, data referred to only by the snapshot to be processed, in which the data of the snapshot to be processed is not shared from the snapshot of one newer generation or the snapshot of one older generation, is searched, and the defragmentation processing is performed. On the other hand, there is also data shared by a plurality of snapshots. In addition, in the backup use case, since a snapshot delete instruction is issued starting from the oldest snapshot, it can be considered that the snapshot issued with the snapshot delete instruction is the oldest snapshot. In the second embodiment, if it can be determined in the data search processing 2105-2 that there is no data sharing with one new generation of snapshot, it is determined as defragmentation target data. That is, even in the data shared from a plurality of snapshots, if the processing target snapshot is the latest snapshot among the snapshots in which the data is shared, the data is determined as the defragmentation target data.

Figure 27:
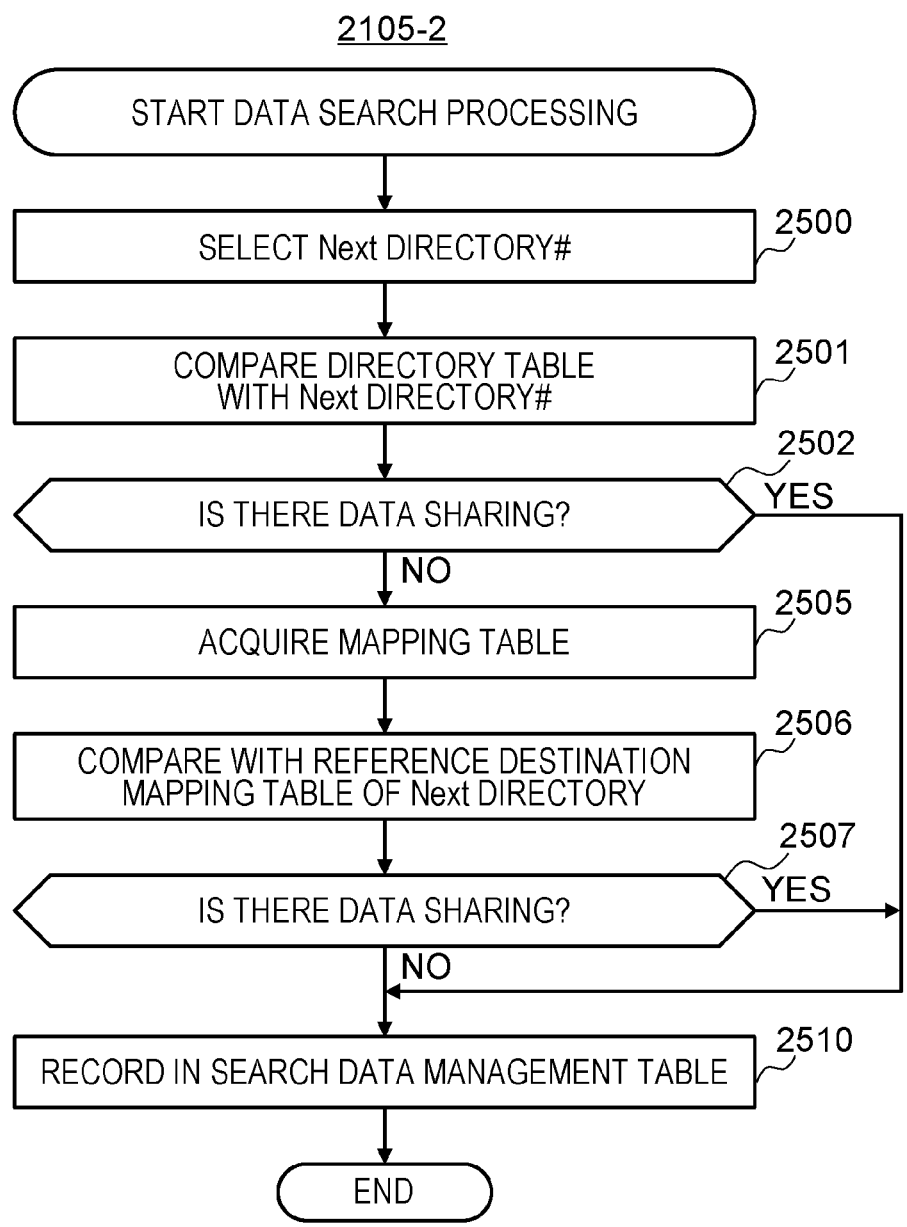
FIG. 27 is a flowchart illustrating a processing procedure of data search processing of a second embodiment.

FIG. 27 is a flowchart illustrating a processing procedure of the data search processing of the snapshot data defragmentation processing of the second embodiment. In the first embodiment, only the data search processing 2105-1 of the snapshot data defragmentation processing 214-1 is changed to the data search processing 2105-2. In addition, 2500, 2501, 2502, 2506, and 2507 in FIG. 27 are the same as 2200, 2201, 2202, 2206, and 2207 in FIG. 22, respectively.

After the processing corresponding to the next directory # of 2500, 2501, and 2502, in the second embodiment, the snapshot data defragmentation program 214-1 does not perform the processing corresponding to the previous directory # of 2203 and 2204, and moves the process to 2505.

In 2505, the snapshot data defragmentation program 214-1 acquires the mapping table 403-0 of each of the reference destination address (in-mapping area address) 501 of the directory table 402 of the processing target snapshot and the reference destination address (in-mapping area address) 501 of the directory table 402 of the next directory #.

After the processing corresponding to the mapping table 403-0 referred to by the next directory # of 2506 and 2507, in the second embodiment, the snapshot data defragmentation program 214-1 does not perform the processing corresponding to the mapping table 403-0 referred to by the previous directory # of 2208 and 2209, and moves to 2510.

In 2510, since the snapshot data defragmentation program 214-1 can search for data that is the latest snapshot among snapshots shared by the processing target snapshot, the data is added to the search data management table 227.

In the second embodiment, data ("B0") shared between the snapshot 301-1 and the snapshot 301-0 in FIG. 26 can also be collected in the GC unnecessary page 312-1 as data to be set as garbage when the snapshot 301-1 is instructed to delete a snapshot.

Third Embodiment

Hereinafter, a third embodiment of the present invention will be described using FIGS. 28 and 29.

In the first embodiment, in the snapshot data defragmentation processing 214-1, information is set in the write-once volume mapping table 403-1 so that the defragmentation target data can be determined, and the defragmentation target data is copied in the garbage collection processing. In the third embodiment, the copy processing of defragmentation target data is performed in snapshot data defragmentation processing 214-2.

Figure 28:
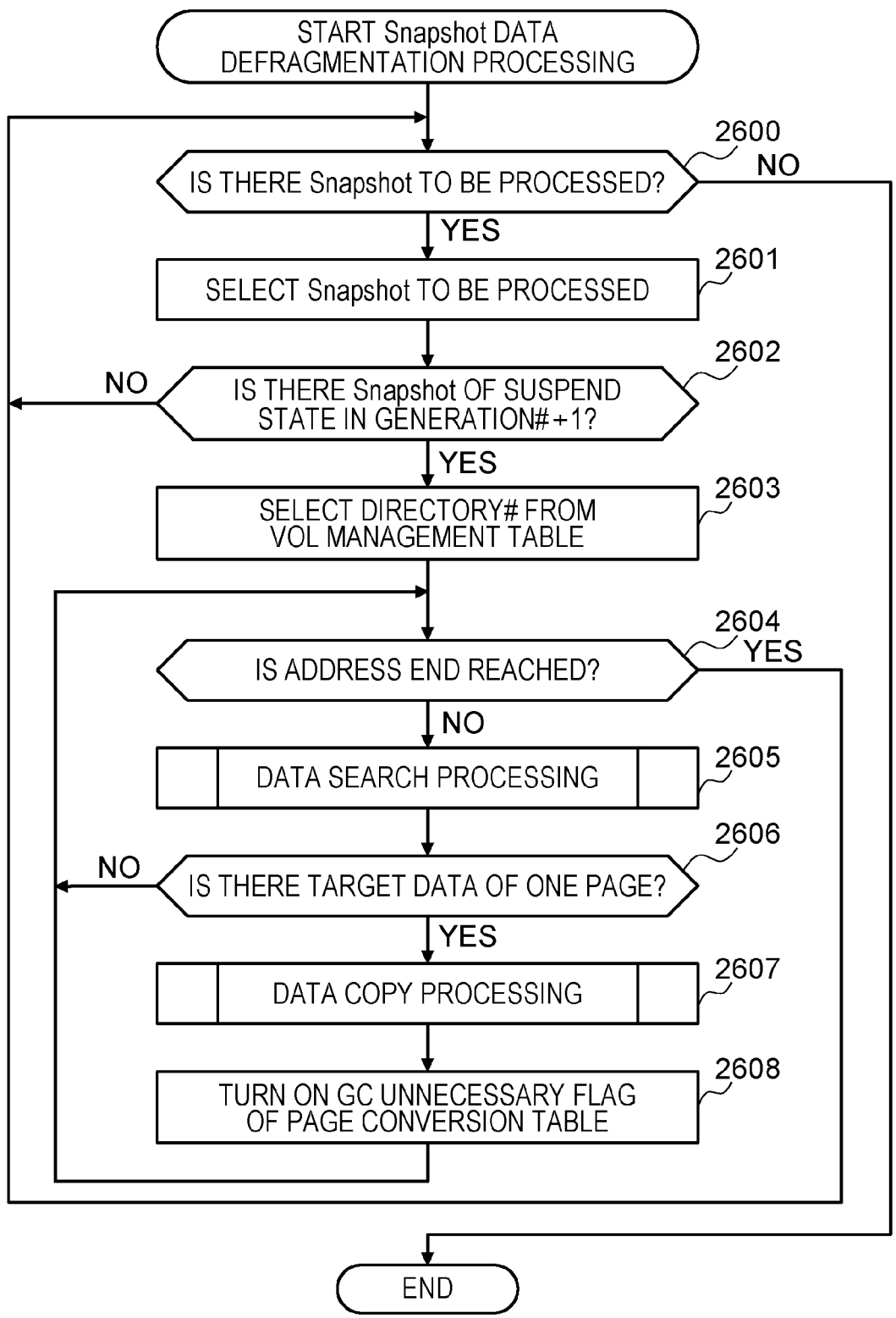
FIG. 28 is a flowchart illustrating a processing procedure of snapshot data defragmentation processing of a third embodiment.

FIG. 28 is a flowchart illustrating a processing procedure of snapshot data defragmentation processing of the third embodiment. 2600, 2601, 2602, 2603, 2604, 2605, and 2606 in FIG. 28 are the same as 2100, 2101, 2102, 2103, 2104, 2105, and 2106 in FIG. 21, respectively.

In 2607 subsequent to 2606, the snapshot data defragmentation 214-2 performs the copy processing of the searched defragmentation data. Details will be described later with reference to FIG. 29.

In 2608, the snapshot data defragmentation 214-2 sets the copy destination page as a GC processing-unnecessary page since the copy destination pages are spread with the differential data of the specific snapshot by 2607. Specifically, the GC unnecessary flag 1203 of the page conversion table 224 is unnecessarily updated. As a result, it is not selected as a GC processing target thereafter, and copy becomes unnecessary.

Figure 29:
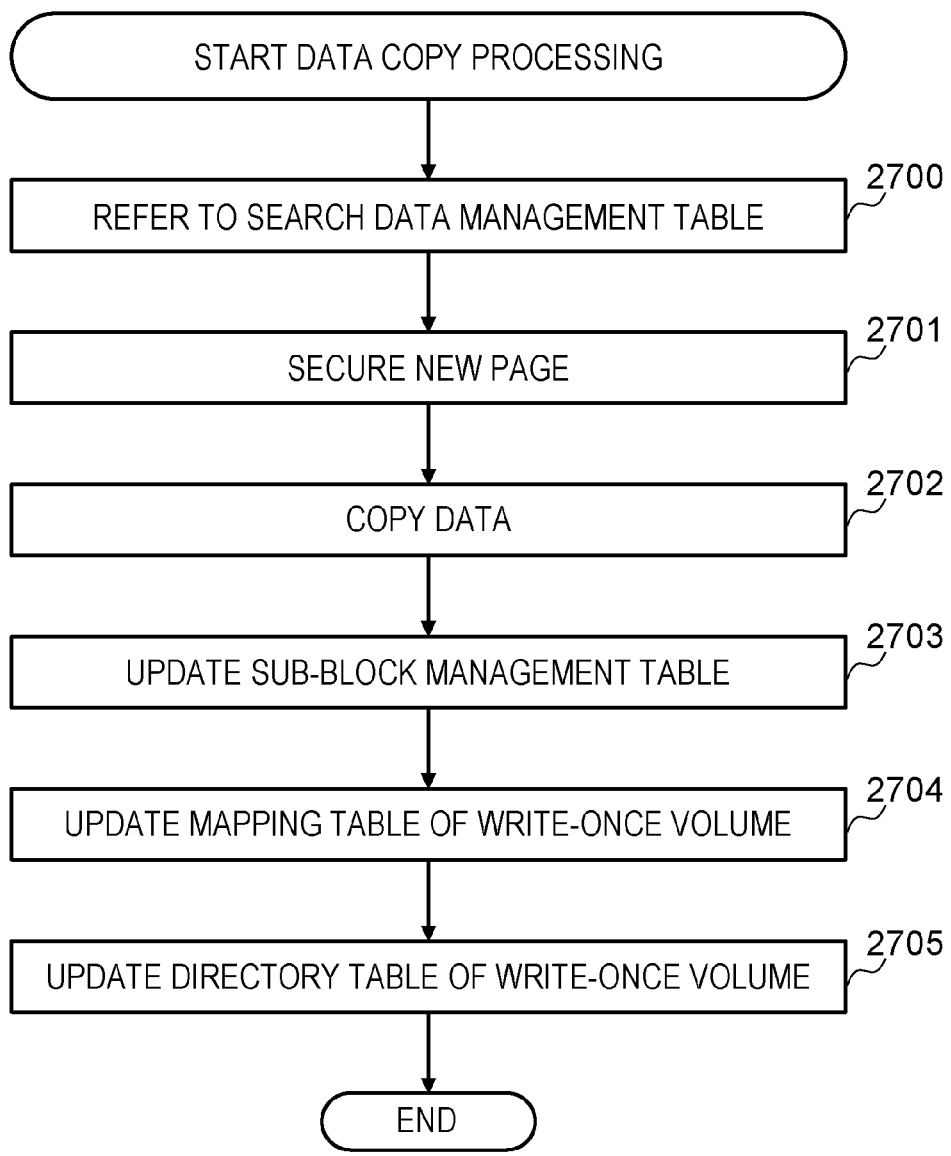
FIG. 29 is a flowchart illustrating a processing procedure of data copy processing of the third embodiment.

FIG. 29 is a flowchart illustrating a processing procedure of data copy processing according to the third embodiment. First, in 2700, the snapshot data defragmentation 214-2 refers to the search data management table 227 to which the data copy program defragmentation target data is additionally written.

Next, in 2701, the snapshot data defragmentation 214-2 updates the page allocation management table 225 and allocates a new page 312 which is a copy destination of the defragmentation target data.

In 2702, the snapshot data defragmentation 214-2 copies the sub-block of the defragmentation target data to the page 312 of the write-once area 404-1 of the write-once volume secured in 2701. Specifically, the directory table 402-2 of the write-once volume corresponding to the reference destination address (in-write-once area address of the snapshot management volume) 1501 of the search data management table is referred to, and the reference destination address (in-mapping area address) 501 is acquired. The sub-block 313 to be copied is specified and copied with reference to the reference destination address (in-write-once area address) 701 of the write-once volume mapping table 403-1 corresponding to the acquired in-mapping area address.

In 2703, the snapshot data defragmentation 214-2 adds a record corresponding to the copied data to the sub-block management table.

Next, in 2704, since the sub-block is copied in 2702, the snapshot data defragmentation 214-2 updates the target record of the write-once volume mapping table 403-1 which refers to the copied sub-block.

In 2705, since the reference destination address (in-mapping area address) 501 of the directory table 402-2 of the write-once volume changes due to the update of the mapping table of 2704, the snapshot data defragmentation 214-2 performs the update. The address (in-mapping area address) of the mapping table updated in 2104 is set to the reference destination address (in-mapping area address) 501 of the directory table 402.

As described above, the storage system 100 of the disclosure includes the storage device (PDEV 120) and the processor 111 configured to process data input to and output from the storage device. The processor 111 is configured to: form a page capable of storing a plurality of pieces of data in a logical storage area configured based on a physical storage area of the storage device; provide a volume and input/output data related to data input/output with respect to the volume to/from a page of the logical storage area; map the volume to data of the logical storage area; be able to release the storage area in units of the pages; include a plurality of the volumes that can share data of the logical storage area; perform garbage collection of deleting data which is not referred to from any of the plurality of volumes as invalid data, moving data which is referred to from any of the volumes to another page, and releasing a storage area of a page on which the data is deleted and the data is moved; and store a plurality of pieces of data in the page of a movement destination such that the plurality of pieces of data stored in the same page is mapped from a same volume by the garbage collection.

Therefore, the memory can be efficiently managed while the GC processing amount is suppressed, and the data processing performance can be maintained.

The volume includes a main volume to which data is input and output and a plurality of snapshot volumes duplicated from the main volume. A page of data mapped only from one of the snapshot volumes is excluded from the garbage collection.

Therefore, the garbage collection related to the snapshot volume can be made efficient.

When a snapshot volume mapped to data of a page excluded from the garbage collection is deleted, the system of the disclosure deletes the page regardless of the garbage collection to release a storage area.

Therefore, it is possible to efficiently delete the snapshot.

As an example, the volume includes a main volume to which data is input and output and a plurality of snapshot volumes duplicated from the main volume. The plurality of snapshot volumes are snapshot volumes of a plurality of generations copied at different times from a same main volume. The snapshot volumes of the plurality of generations are deleted from an older generation. A plurality of pieces of data having a same snapshot volume of a latest generation among one or more snapshot volumes storing each piece of the data are stored in a same page, and are set to a page that is excluded from the garbage collection.

In this configuration, deletion of old snapshots can be made efficient.

As an example, the volume includes a main volume to which data is input and output and a plurality of snapshot volumes duplicated from the main volume. The plurality of snapshot volumes are created by copying the main volume and include a plurality of generations of snapshot volumes created from the main volume at different times. Each of the plurality of snapshot volumes includes data shared on the logical storage area in common with data of the main volume and another snapshot volume, and data held independently without being shared with data of the main volume and another snapshot volume. A page storing only data held independently by one of the snapshot volumes is excluded from the garbage collection.

In this configuration, the garbage collection can be made efficient based on the generation of the snapshot volume.

the storage system 100 of the disclosure is a storage system including a storage device (PDEV 120) and a processor 111 configured to process data input to and output from the storage device. The processor 111 is further configured to: form a page capable of storing a plurality of pieces of data in a logical storage area configured based on a physical storage area of the storage device; provide a volume and input/output data related to data input/output with respect to the volume to/from a page of the logical storage area; map the volume to data of the logical storage area; include a plurality of the volumes that can share data of the logical storage area; perform garbage collection processing of deleting data which is not referred to from any of the plurality of volumes as invalid data, moving data which is referred to from any of the plurality of volumes to another page, and releasing a storage area of a page on which the data is deleted and the data is moved; set a page mapped from a same volume for all stored data to be excluded from the garbage collection processing; and when the one volume to which data of a page set to be excluded from the garbage collection processing is mapped is deleted, delete the data and release a storage area of a page.

Therefore, the memory can be efficiently managed while the GC processing amount is suppressed, and the data processing performance can be maintained.

The volume includes a main volume to which data is input and output and a plurality of snapshot volumes duplicated from the main volume. A page in which all data are mapped only from a same one snapshot volume is set to be excluded from the garbage collection processing, and a page storing data mapped from the main volume is set to the garbage collection processing.

Therefore, the garbage collection related to the snapshot volume can be made efficient.

The volume includes a main volume to which data is input and output and a plurality of snapshot volumes duplicated from the main volume. The plurality of snapshot volumes are snapshot volumes of a plurality of generations copied at different times from a same main volume. The snapshot volumes of the plurality of generations are deleted from an older generation. A plurality of pieces of data having a same snapshot volume of a latest generation among one or more snapshot volumes storing each piece of the data are stored in a same page, and are set to a page that is excluded from the garbage collection.

Therefore, old snapshots can be efficiently deleted.

Further, the present invention is not limited to the above embodiments, and various modifications may be contained. For example, although only one storage system 100 in FIG. 1 is illustrated, a cluster configuration including a plurality of storage systems may be used, or the storage system may be on a cloud. In addition, the above embodiments have been described in detail for easy understanding of the present invention, and the present invention is not necessarily limited to those having all the configurations described. In addition, the configuration is not limited to the deletion, and the configuration can be replaced or added.

Each of the above configurations, functions, processing units, processing means, and the like may be partially or entirely achieved by hardware by, for example, designing by an integrated circuit. In addition, the present invention may be realized by a software program code which realizes the functions of the embodiments. In this case, a recording medium recorded with the program code is provided to a computer, and a processor of the computer reads out the program code stored in the recording medium. In this case, the program code itself read out of the recording medium is used to realize the functions of the above embodiments. The program code itself and the recording medium storing the program code is configured in the present invention. As a recording medium to supply such a program code, for example, there are a flexible disk, a CD-ROM, a DVD-ROM, a hard disk, a Solid State Drive (SSD), an optical disk, a magneto-optical disk, a CD-R, a magnetic tape, a nonvolatile memory card, and a ROM.

In addition, the program code to realize the functions of the present embodiment may be embedded by a wide program such as assembler, C/C++, perl, Shell, PHP, Java (registered trademark) or a script language.

In the above embodiments, only control lines and information lines considered to be necessary for explanation are illustrated, but not all the control lines and the information lines for a product are illustrated. All the configurations may be connected to each other.

What is claimed is:

1. A storage system comprising:
a storage device; and
a processor configured to process data input to and output from the storage device, wherein the processor is configured to:
   form a page capable of storing a plurality of pieces of data in a logical storage area configured based on a physical storage area of the storage device;
   provide a volume and input/output data related to data input/output with respect to the volume to/from a page of the logical storage area;
   map the volume to data of the logical storage area;
   be able to release the storage area in units of the pages;
   include a plurality of the volumes that can share data of the logical storage area;
   perform garbage collection of deleting data which is not referred to from any of the plurality of volumes as invalid data, moving data which is referred to from any of the volumes to another page, and releasing a storage area of a page on which the data is deleted and the data is moved; and
   store a plurality of pieces of data in the page of a movement destination such that the plurality of pieces of data stored in the same page is mapped from a same volume by the garbage collection,
wherein the volume includes a main volume to which data is input and output and a plurality of snapshot volumes duplicated from the main volume, and
wherein a page of data mapped only from one of the snapshot volumes is excluded from the garbage collection.

2. The storage system according to claim 1, wherein when a snapshot volume mapped to data of a page excluded from the garbage collection is deleted, the page is deleted regardless of the garbage collection to release a storage area.

3. The storage system according to claim 1, wherein
the plurality of snapshot volumes are snapshot volumes of a plurality of generations copied at different times from a same main volume,
the snapshot volumes of the plurality of generations are deleted from an older generation, and a plurality of pieces of data having a same snapshot volume of a latest generation among one or more snapshot volumes storing each piece of the data are stored in a same page, and are set to a page that is excluded from the garbage collection.

4. The storage system according to claim 1, wherein
the plurality of snapshot volumes are created by copying the main volume and include a plurality of generations of snapshot volumes created from the main volume at different times,
each of the plurality of snapshot volumes includes data shared on the logical storage area in common with data of the main volume and another snapshot volume, and data held independently without being shared with data of the main volume and another snapshot volume, and
a page storing only data held independently by one of the snapshot volumes is excluded from the garbage collection.

5. A storage system comprising:
a storage device; and
a processor configured to process data input to and output from the storage device, wherein the processor is further configured to:
   form a page capable of storing a plurality of pieces of data in a logical storage area configured based on a physical storage area of the storage device;
   provide a volume and input/output data related to data input/output with respect to the volume to/from a page of the logical storage area;
   map the volume to data of the logical storage area;
   include a plurality of the volumes that can share data of the logical storage area;
   perform garbage collection processing of deleting data which is not referred to from any of the plurality of volumes as invalid data, moving data which is referred to from any of the plurality of volumes to another page, and releasing a storage area of a page on which the data is deleted and the data is moved;
   set a page mapped from the same volume for all stored data to be excluded from the garbage collection processing; and
   when the one volume to which data of a page set to be excluded from the garbage collection processing is mapped is deleted, delete the data and release a storage area of a page,
wherein the volume includes a main volume to which data is input and output and a plurality of snapshot volumes duplicated from the main volume, and
wherein a page in which all data are mapped only from a same one snapshot volume is set to be excluded from the garbage collection processing, and a page storing data mapped from the main volume is set to the garbage collection processing.

6. The storage system according to claim 5, wherein
the plurality of snapshot volumes are snapshot volumes of a plurality of generations copied at different times from a same main volume,
the snapshot volumes of the plurality of generations are deleted from an older generation, and
a plurality of pieces of data having a same snapshot volume of a latest generation among one or more snapshot volumes storing each piece of the data are stored in a same page, and are set to a page that is excluded from the garbage collection.

* * * * *